(12) United States Patent
Tao et al.

(10) Patent No.: US 11,774,841 B2
(45) Date of Patent: Oct. 3, 2023

(54) IMAGE PROJECTION STRUCTURE, METHOD FOR MANUFACTURING SAME, AND IMAGE DISPLAY SYSTEM

(71) Applicant: AGC Inc., Tokyo (JP)

(72) Inventors: Yukihiro Tao, Tokyo (JP); Naruki Yamada, Tokyo (JP); Osamu Iwata, Tokyo (JP); Yoshinori Iguchi, Tokyo (JP); Yusuke Sato, Tokyo (JP); Yoko Mitsui, Tokyo (JP); Tsuneo Ichimatsu, Tokyo (JP)

(73) Assignee: AGC Inc., Tokyo (JP)

( * ) Notice: Subject to any disclaimer, the term of this patent is extended or adjusted under 35 U.S.C. 154(b) by 372 days.

(21) Appl. No.: 17/072,229

(22) Filed: Oct. 16, 2020

(65) Prior Publication Data

US 2021/0072632 A1 Mar. 11, 2021

Related U.S. Application Data

(63) Continuation of application No. PCT/JP2019/020714, filed on May 24, 2019.

(30) Foreign Application Priority Data

May 25, 2018 (JP) .................................. 2018-100129

(51) Int. Cl.
*G03B 21/62* (2014.01)
*B29D 11/00* (2006.01)
(Continued)

(52) U.S. Cl.
CPC ........ *G03B 21/62* (2013.01); *B29D 11/00269* (2013.01); *G03B 21/56* (2013.01);
(Continued)

(58) Field of Classification Search
CPC ...... G03B 21/60; G03B 21/602; G03B 21/56; G03B 21/625; G03B 21/604
(Continued)

(56) References Cited

U.S. PATENT DOCUMENTS

| 7,074,463 B2 * | 7/2006 | Jones | ...................... G02B 5/124 |
| | | | 977/840 |
| 7,157,133 B2 * | 1/2007 | Moran | ...................... B32B 3/30 |
| | | | 428/164 |

(Continued)

FOREIGN PATENT DOCUMENTS

| CN | 113383307 A | * | 9/2021 | ............. G03B 21/60 |
| CN | 114488527 A | * | 5/2022 | |

(Continued)

OTHER PUBLICATIONS

International Search Report dated Aug. 13, 2019 in PCT/JP2019/020714 filed May 24, 2019, 2 pages.

*Primary Examiner* — Stephanie E Bloss
*Assistant Examiner* — Kevin C Butler
(74) *Attorney, Agent, or Firm* — Oblon, McClelland, Maier & Neustadt, L.L.P.

(57) ABSTRACT

There are provided a video projecting structure, which is capable of having not only transparency but also high visibility of a video, a process for producing the same, and a video display system including the video projection structure.

A video projecting structure includes a first transparent layer having irregularities disposed on a surface thereof, a reflective layer disposed on the surface of the first transparent layer, and a second transparent layer disposed on the reflective layer; wherein when a surface of the first transparent layer opposite to the reflective layer is defined as a reference (Continued)

surface, the irregularities include a plurality of slant surfaces slant to the reference surface and reflecting light from a video; wherein when a first direction, a second direction and a third direction are defined such that the first direction is perpendicular to a normal direction of the reference surface, the slant surfaces extend in the first direction, the second direction is orthogonal to the first direction, the slant surfaces are arrayed in the second direction, and the third direction is a direction in which the slant surfaces have an average slant angle θ to the reference surface in section in the second direction; the irregularities include a portion which is configured such that when an average spacing $Sm_1$ of the irregularities in the first direction, an average spacing $Sm_2$ of the irregularities in the second direction and an average spacing $Sm_3$ of the irregularities in the third direction are such that $Sm_2>Sm_1$ and $Sm_3>Sm_1$ are met, and $Sm_2$ is maximum; and wherein the irregularities include a portion which is configured such that when a frequency distribution of inclinations of the irregularities in the second direction to the reference surface is measured in 0.25° divisions in every distance of 1 mm in order that the frequencies are represented as distances, the absolute value of a median value in the frequency distribution is a value other than 0°.

20 Claims, 16 Drawing Sheets

(51) Int. Cl.
G03B 21/625 (2014.01)
G03B 21/56 (2006.01)
G03B 21/602 (2014.01)
G03B 21/604 (2014.01)
G03B 21/60 (2014.01)
B29K 701/12 (2006.01)

(52) U.S. Cl.
CPC ........... *G03B 21/60* (2013.01); *G03B 21/602* (2013.01); *G03B 21/604* (2013.01); *G03B 21/625* (2013.01); *B29K 2701/12* (2013.01)

(58) Field of Classification Search
USPC ........................................................ 359/459
See application file for complete search history.

(56) References Cited

U.S. PATENT DOCUMENTS

| | | | | |
|---|---|---|---|---|
| 7,230,767 | B2 * | 6/2007 | Walck | G02B 27/01 359/630 |
| 8,519,362 | B2 * | 8/2013 | Labrot | B32B 17/10669 250/461.2 |
| 9,857,041 | B2 * | 1/2018 | Ueki | F21V 3/049 |
| 2015/0138627 | A1 * | 5/2015 | Ehrensperger | G03B 21/60 359/443 |
| 2015/0358574 | A1 * | 12/2015 | Henion | H04N 5/7475 349/5 |
| 2017/0075207 | A1 * | 3/2017 | Tao | G02B 5/0242 |
| 2021/0072632 | A1 * | 3/2021 | Tao | G02B 5/02 |
| 2021/0240068 | A1 * | 8/2021 | Yamada | G02B 5/08 |

FOREIGN PATENT DOCUMENTS

| | | | | |
|---|---|---|---|---|
| EP | 3358404 A1 * | 8/2018 | ......... | G02B 27/0101 |
| JP | 2014-509963 A | 4/2014 | | |
| WO | WO-2017057564 A1 * | 4/2017 | ......... | G02B 27/0101 |

* cited by examiner (Short focus projector)

(Short focus projector)

IMAGE PROJECTION STRUCTURE, METHOD FOR MANUFACTURING SAME, AND IMAGE DISPLAY SYSTEM

TECHNICAL FIELD

The present invention relates to a video projecting structure capable of making an image in the background visible as well, a process for producing the same, and a video display system including the video projection structure.

BACKGROUND ART

Patent Document 1 listed below discloses a reflective video projection structure, which is capable of making an image in the background observable. The video projection structure includes a first transparent layer having random irregularities formed on a surface thereof, a reflective film formed on a surface of the first transparent layer with the random irregularities thereon; and a second transparent layer formed on the reflective film. The video projecting structure serves as a transparent window when no video is projected. On the other hand, the video projecting structure serves as a screen when a video is projected.

PRIOR ART DOCUMENTS

Patent Documents

Patent Document 1: JP-A-2014-509963

DISCLOSURE OF INVENTION

Technical Problem

FIGS. 16 to 19 are explanatory views for illustrating the usage of a video projecting structure. Here, in FIGS. 16 to 19, one observer 200 is illustrated, but there may be a case where a plurality of observers 200 are present. Explanation will be made about a case where a projector 110 is used.

When an observer 200 is present at a position to see light projected from the projector 110, in the form of regular reflected light due to reflection by the video projecting structure 101 as shown in FIG. 16, the visibility of the projection surface (screen) is high. As shown in FIG. 17, with respect to the light reflected at an end portion of the video projecting structure 101, the number of observers 200 who can view an image produced by regular reflected light is small. That is, the visibility at the end portion of the screen is lower for many observers 200. Further, because the projector 110 is usually installed in the vicinity of an end portion to the video projecting structure 101, the reflection angle of the light reflected at the other end of the video projecting structure 101 becomes smaller as the screen becomes larger, whereby the number of observers 200, to whom the visibility of the image by the regular reflected light becomes lower, tends to be larger. In particular, when an observer 200 is present in a bright surrounding environment, the reduction in the visibility is significant.

Also, when the projector 110 is installed on the opposite side of the video projection structure 101 to an observer 200 such that the observer 200 observes an image transmitted through the video projection structure 101, a similar problem is caused. Specifically, when the observer 200 is present at a position close to the optical axis of transmitted light, the visibility of the projection surface (screen) is high. In contrast, with respect to the light transmitted through an end portion of the video projecting structure 101, the number of observers 200 who can view an image produced by the transmitted light is small because the amount of scattered light is small. In other words, the visibility with respect to the end portion of the screen is low to many observers 200. In particular, when an observer 200 is present in a bright surrounding environment, the reduction in the visibility is significant.

When the projector 110 is a short focus projector, the number of the observers, to whom the visibility of the screen becomes lower, tends to be larger because the distance between the installment position of the projector 110 and the video projecting structure 101 is short as illustrated in FIGS. 18 and 19. Although FIGS. 18 and 19 illustrate cases of front projection where an observer 200 observes an image produced by reflected light, this is also true to a case of rear projection where an observer observes an image produced by transmitted light.

Such a video projecting structure fails to serve as a transparent video projecting structure unless some measures (improvements) are taken. For example, when such a video projecting structure is made transparent without taking any measures, the brightness of a video could be reduced.

It is an object of the present invention to provide a video projecting structure, which is capable of having not only transparency but also high visibility of a video.

Solution to Problem

The video projecting structure according to the present invention includes a first transparent layer having irregularities disposed on a surface thereof, a reflective layer disposed on the surface of the first transparent layer, and a second transparent layer disposed on the reflective layer; wherein when a surface of the first transparent layer opposite to the reflective layer is defined as a reference surface, the irregularities include a plurality of slant surfaces slant to the reference surface and reflecting light from a video; wherein when a first direction, a second direction and a third direction are defined such that the first direction is perpendicular to a normal direction of the reference surface, the slant surfaces extend in the first direction, the second direction is orthogonal to the first direction, the slant surfaces are arrayed in the second direction, and the third direction is a direction in which the slant surfaces have an average slant angle $\theta$ to the reference surface in section in the second direction; the irregularities include a portion which is configured such that when an average spacing $Sm_1$ of the irregularities in the first direction, an average spacing $Sm_2$ of the irregularities in the second direction and an average spacing $Sm_3$ of the irregularities in the third direction are such that $Sm_2 > Sm_1$ and $Sm_3 > Sm_1$ are met, and $Sm_2$ is maximum; and wherein the irregularities include a portion which is configured such that when a frequency distribution of inclinations of the irregularities in the second direction to the reference surface is measured in 0.25° divisions in every distance of 1 mm in order that the frequencies are represented as distances, the absolute value of a median value in the frequency distribution is a value other than 0°.

The process for producing a video projecting structure according to the present invention provides a process for producing a video projecting structure, including a first transparent layer having irregularities disposed on a surface thereof, a reflective layer disposed on the surface of the first transparent layer, and a second transparent layer disposed on the reflective layer, the process including forming the first transparent layer having a plurality of slant surfaces disposed on the surface so as to be slant to a reference surface when a surface of the first transparent layer opposite to the reflective layer is defined as the reference surface; forming the irregularities so as to include a portion which is configured such that when a first direction, a second direction and a third direction are defined such that the first direction is perpendicular to a normal direction of the reference surface, the slant surfaces extend in the first direction, the second direction is orthogonal to the first direction, the slant surfaces are arrayed in the second direction, and the third direction is a direction in which the slant surfaces have an average slant angle θ to the reference surface in section in the second direction, an average spacing $Sm_1$ of the irregularities in the first direction, an average spacing $Sm_2$ of the irregularities in the second direction and an average spacing $Sm_3$ of the irregularities in the third direction are such that $Sm_2>Sm_1$ and $Sm_3>Sm_1$ are met, and $Sm_2$ is maximum; further forming the irregularities so as to include a portion which is configured such that when a frequency distribution of inclinations of the irregularities in the second direction to the reference surface is measured in 0.25° divisions in every distance of 1 mm in order that the frequencies are represented as distances, the absolute value of a median value in the frequency distribution is a value other than 0°; and forming the second transparent layer on the reflective layer.

A video display system according to the present invention includes the above-mentioned video projecting structure; and a projector projecting a video on a side of the video projecting structure with the second transparent layer is disposed, or the above-mentioned video projecting structure, and a projector projecting a video on a side of the video projecting structure with the first transparent layer is disposed.

Advantageous Effects of Invention

In accordance with the present invention, there is provided a video projecting structure, which is capable of having not only transparency but also high visibility of a video, and which is also capable of changing the visibility of an image projected on the video projecting structure according to a viewing direction. Thus, the present invention provides a video projecting structure, which allows a plurality of observers to view a video with excellent visibility even when the observers view the video from different directions or when the observers view the video projected on an end portion of the video projecting structure.

DESCRIPTION OF EMBODIMENTS

Now, embodiments of the present invention will be described in reference to the accompanying drawings.

Figure 1:
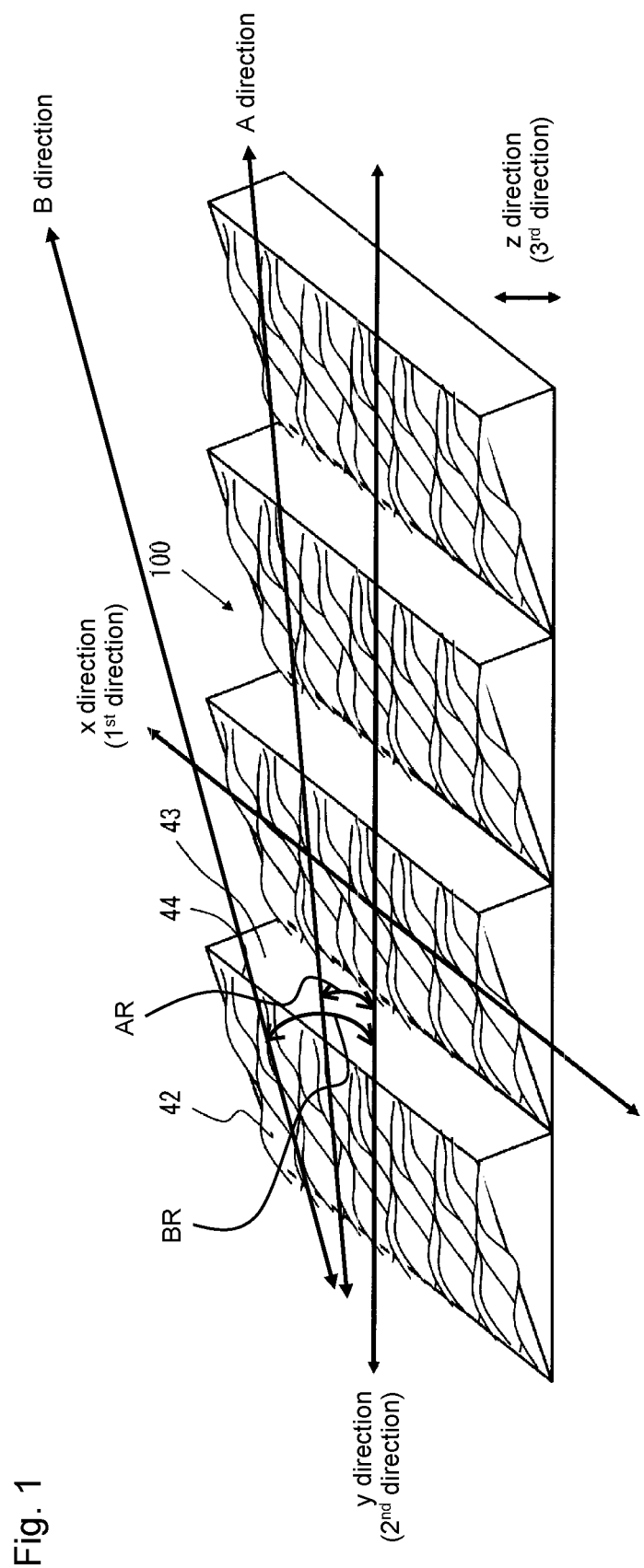
FIG. 1 is a perspective view illustrating the configuration of a video display structure.

FIG. 1 is a perspective view illustrating the configuration of essential parts of a video display structure according to the present invention. As illustrated in FIG. 1, the video display structure 100 is configured to have a plurality of slant surfaces 42 ranged thereacross. Between two adjacent slant surfaces 42 is formed a step surface 43. As described later, the slant surfaces 42 and the step surfaces 43 are formed on a first transparent layer (not shown in FIG. 1). In FIG. 1, when the first transparent layer has a rear surface defined as a reference surface, and when the reference surface has a normal direction extending in a z direction, the extending direction of the respective surfaces 42 and perpendicular to the z direction is defined as an x direction, and the array direction of the plurality of slant surfaces 42 and perpendicular to the x direction and the z direction is defined as a y direction. It should be noted that when each slant surface 42 has an edge 44 formed in a straight line, the extending direction of each slant surface 42 is the same as the extending direction of the edge 44.

Although each edge 44 is shown to be formed in a straight line in FIG. 1, each edge may be formed in a curved line, not a straight line, or a curved line like a wave having no constant curvature or cycle. Each edge 44 may be discontinuously formed. When a slant surface 42 merges into its adjunct step surface 43, the farthest position of both surfaces from the rear surface 41 of the first transparent layer 21 may be defined as the edge 44 between both surfaces.

Each step surface 43 may be formed in a surface having a plurality of bulges like spherical shapes, a shape like a lens surface, a concavo-convex shape, or a discontinuous or interrupted shape, instead of a flat surface. When each step surface is not formed in a flat surface, it is sufficient that the average value of the angles of the slant surfaces 42 in their normal directions with respect to the rear surface 41 of the first transparent layer 21 is larger than the average value of the angles of the step surfaces 43 in their normal directions with respect to the rear surface 41 of the first transparent layer 21. Each slant surface 42 is preferred to have a larger area than its adjacent step surface 43 under the condition just mentioned.

Figure 2:
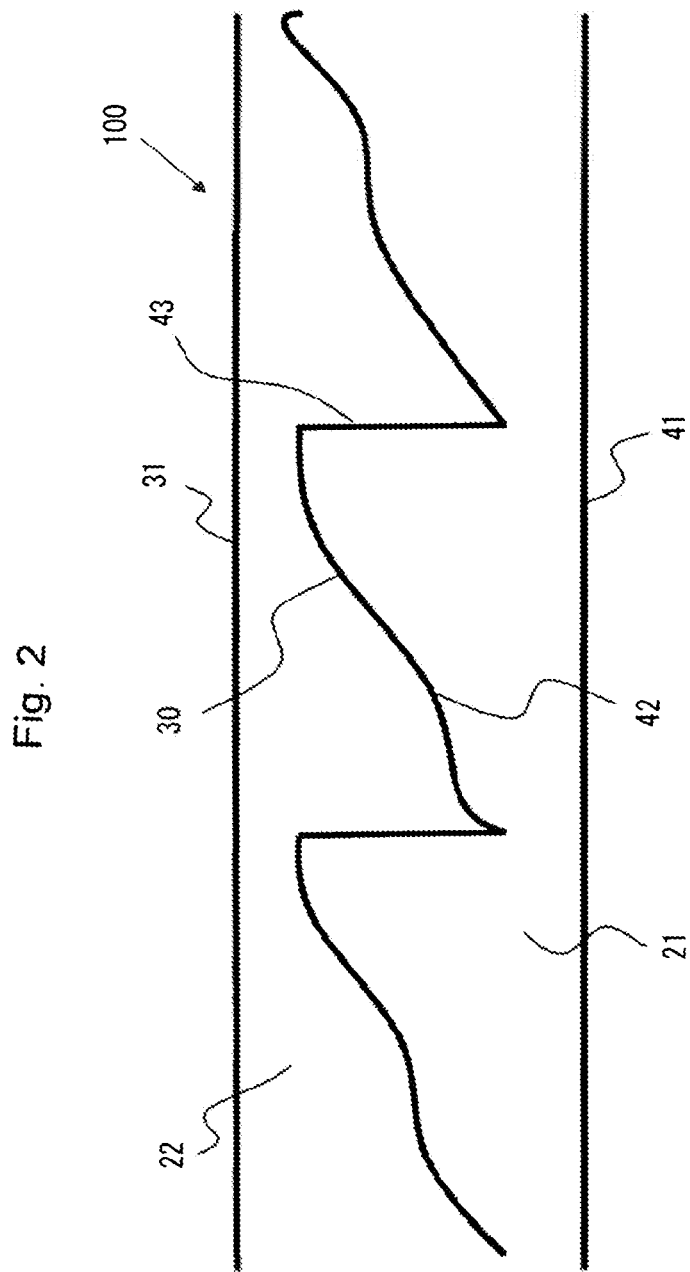
FIG. 2 is a cross-sectional view illustrating the configuration of the video display structure.

In FIG. 2 is illustrated an example of the cross-section of the video display structure 100 (cross-section in they direction). As illustrated in FIG. 2, the video display structure 100 includes the first transparent layer 21 having fine irregularities formed thereon, a reflective film 30 formed on a surface of the first transparent layer 21 with the irregularities, and a second transparent layer 22 formed on the reflective film 30. The second transparent layer 22 is formed so as to embed the irregularities. The second transparent layer 22 has a flat surface 31 opposite to the reflective film 30. The rear surface (reference surface) 41 of the first transparent layer 21 may be a flat surface or a curved surface.

Figure 3:
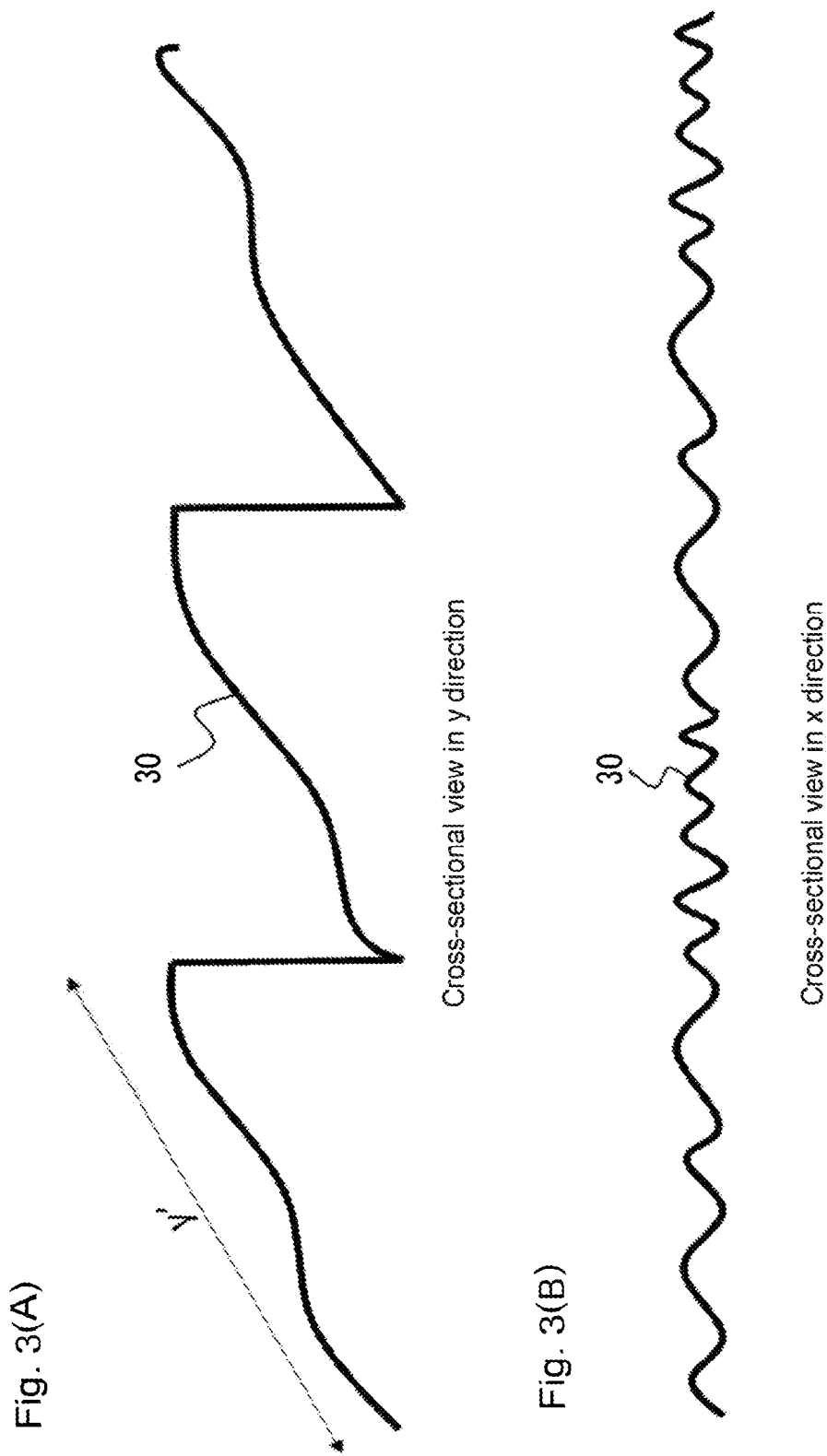
FIGS. 3(A) and 3(B) are cross-sectional views illustrating the shape of a reflective layer.

FIGS. 3(A) and (B) are explanatory views illustrating the surface shape of the reflective film 30. FIG. 3(A) illustrates a cross-sectional view of the reflective film 30 in the y direction while FIG. 3(B) illustrates a cross-sectional view of the reflective film 30 in the x direction.

As illustrated in FIGS. 3(A) and (B), the average spacing of the irregularities in the x direction is narrower than the average spacing in the y direction.

As one example, the irregularities have the average spacing (hereinbelow, referred to as representative cycle) Sm as the index. The representative cycle in the x direction and the representative cycle in the y direction are defined as $Sm_x$ and $Sm_y$, respectively. The representative cycle in a y' direction is defined as $Sm_{y'}$. The y' direction is a direction in which a slant surface 42 has an average slant angle θ to the reference surface (specifically, the straight line in the y direction on the reference surface) in section in the y direction. The average angle may be found, for example, by defining, as measuring sections, respective minute sections (1 mm as one example) forming a slant surface in section in the y direction and averaging the angles in the respective measuring sections. As the premise, $Sm_x$ and $Sm_y$ satisfy the relationship represented by formula (1) because $Sm_y$ corresponds to the average spacing of the edges 44. It is not essential that the relationship represented by formula (1) is established over the entire region of the video projecting structure 100. In other words, the relationship may be established in some regions of the video projecting structure 100 while there are other regions having the opposite relationship.

$$Sm_y > Sm_x \qquad (1)$$

Further, in this embodiment, $Sm_{y'}$ is defined to satisfy the relationship represented by formula (2):

$$Sm_{y'} > Sm_x \qquad (2)$$

This embodiment has another purpose of modifying the visibility of an image reflected on the video projecting structure 100 or an image transmitted through the video projecting structure 100 between the x direction (hereinbelow, also referred to transverse direction) and the y direction (hereinbelow, also referred to vertical direction). Since the representative cycle in the x direction is shorter than the representative cycle in the y' direction, the angle of scattered light in the x direction to incident light IL becomes larger than the angle in the y direction. Thus, it is possible to increase the viewing angle in a transverse direction in comparison with the viewing angle in the vertical direction. Strictly speaking, although the angle of scattered light in the y' direction to incident light IL becomes smaller than the angle in the x direction, the angle of scattered light in the x direction to incident light IL may be regarded as becoming smaller than the angle in the y direction unless the slant angle in the y' direction is extremely increased.

The average spacing of the irregularities and the scattering angle of light are not proportional to each other but correlate with each other. From this point of view, a representative cycle is controlled to adjust the scattering angle of light in this embodiment. For example, $Sm_{y'}$ is preferred to be set to at least two times $Sm_x$ in order to set the angle of scattered light in the x direction to incident light IL to a value of at least two times the angle in the y direction. In order to set the angle of scattered light in the y direction to incident light IL to a value of, for example, at least five times the angle in the x direction, it is sufficient to further increase the difference between $Sm_{y'}$ and $Sm_x$. For example, $Sm_{y'}$ may be set to a value of at least five time $Sm_x$.

$Sm_y$ corresponding to the average spacing of the edges 44 is preferably at most 500 μm. When the value exceeds 500 μm, the respective slant surfaces 42 could be visually recognized as being independent. $Sm_y$ is more preferred to be at most 100 μm. When the value exceeds 100 μm, the edges 44 of the slant surfaces 42 could be visually recognized.

$Sm_x$ is preferred to be longer than 0.4 μm. When the value is at most 0.4 μm, the representative cycle becomes shorter than the wavelength of visible light, making it difficult for a scattering phenomenon to be caused. $Sm_x$ is more preferred to be longer than 0.7 μm. When the value is at most 0.7 μm, color distribution occurs according to the angle of scattered light because the wavelength dependence of a scattering phenomenon increases. This increases the possibility that when the video projecting structure 100 is used as a screen, the screen has a white edge portion blurred iridescent on white representation.

Ra (arithmetic average roughness) in the x direction is preferred to be smaller than Ra in the y direction. Since the representative cycle in the x direction becomes shorter than the representative cycle in the y direction, the deflection angle in the x direction increases to prevent light from scattering in the x direction more widely than needed. For a similar reason, Ra in the x direction is preferred to be smaller than PV (the maximum valley depth) in the y direction.

Ra in the x direction is preferably at least 0.05 μm, more preferably at least 0.1 μm in order to maintain a proper viewing angle. On the other hand, Ra in the x direction is preferably at most 5 μm, more preferably at most 2 μm in order to maintain the brightness of a video at a high level without scattering the light more widely than needed.

Ra in the y direction is preferably at least 1 μm, more preferably at least 2 μm in order to maintain a proper deflection angle. On the other hand, Ra in the y direction is preferably at most 25 μm, more preferably at most 10 μm in order to increase the transparency of the video display structure.

PV in the y direction is preferably at least 2 μm, more preferably at least 5 μm in order to maintain a proper deflection angle. On the other hand, PV in the y direction is preferably at most 50 μm, more preferably at most 20 μm in order to increase the transparency.

Ra in the y' direction is preferably at least 0.05 μm, more preferably at least 0.1 μm in order to maintain a proper viewing angle. On the other hand, Ra in the y' direction is preferably at most 5 μm, more preferably at most 2 μm in order to maintain the brightness of a video at a high level without scattering the light more widely than needed.

Ra in the x direction is preferably set to be equal to or larger than Ra in the y' direction in order to make the viewing angle in the x direction wider than the viewing angle in the y' direction. In this case, the difference between Ra in the x direction and Ra in the y' direction is preferably set to be within 10% in order to reduce the occurrence of a ghost produced by a projected video or external light.

In contrast, Ra in the y' direction is preferably set to be equal to or larger than Ra in the x direction in order to make the viewing angle in the y' direction wider than the viewing angle in the x direction. In this case, the difference between Ra in the y' direction and Ra in the x direction is preferably set to be within 10% in order to reduce the occurrence of a ghost produced by a projected video or external light.

The slant angles (average angle) of the slant surfaces 42 are set such that the absolute value of the median value is not 0° when the measuring section is set at 1 mm for example. The median value is preferably larger than +3° or smaller than −3°. In a case where the median value is preferably larger than +3° or smaller than −3°, when the video projecting structure 100 is used as a screen such that a video is projected on the intersection line of the screen and a plane including a projector and an observer, it is possible to avoid a case where the observer is placed in a state to see regular reflected light from the projector such that video projection is made impossible in such an region.

It should be noted that other indexes than Sm may be used. For example, the curvature may be used as the index. When the curvature is used as the index, the average of the curvatures in the x direction may be set to be larger than the average of the curvatures in the y direction. Also, in this embodiment, the structure may include portions where $Sm_{y'}$ satisfies the relationship defined by formula (3):

$$Sm_{y'} > Sm_x \quad (3)$$

Figure 4:
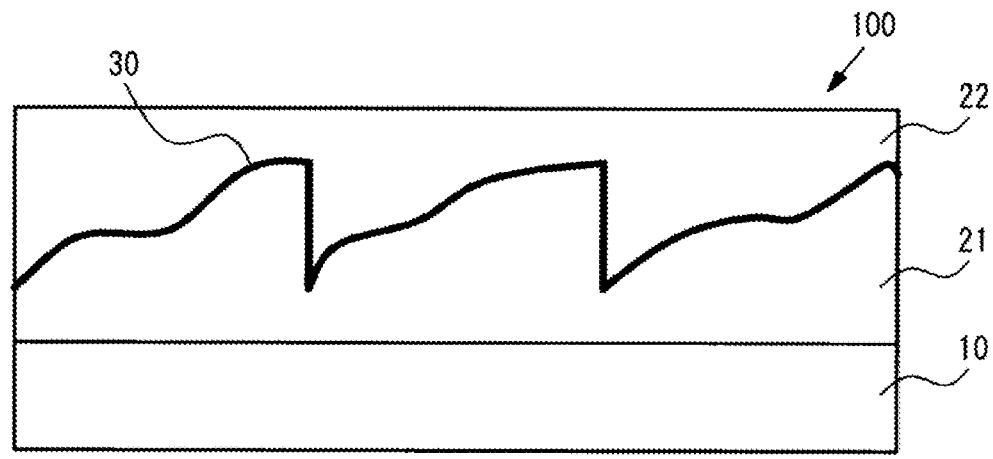
FIG. 4 is an explanatory view illustrating an example of the configuration of the video projecting structure.

FIG. 4 is an explanatory view illustrating an example of the configuration of the video projecting structure 100 according to the present invention. FIG. 4 exemplifies a section of the video projecting structure 100 (specifically a section in the y direction). As illustrated in FIG. 4, the video projecting structure 100 includes a transparent substrate 10, the first transparent layer 21 formed on the transparent substrate 10 and having the fine irregularities formed thereon (see FIG. 1), the reflective layer (reflective film) 30 formed on the surface of the first transparent layer 21 with the fine irregularities thereon, and the second transparent layer 22 formed on the reflective film 30. The second transparent layer 22 is formed so as to embed the irregularities.

The transparent substrate 10 may be, for example, made of glass or a transparent resin. In the case of using glass as the transparent substrate 10, it is preferred to use soda lime glass or alkali-free glass. The glass may be one subjected to chemical strengthening, hard coating or the like in order to improve the durability. In the case of using a transparent resin as the transparent substrate 10, it is preferred to use polycarbonate, PET, PEN, a cycloolefin polymer or the like. The transparent substrate 10 is preferably one having no birefringence.

As the transparent substrate 10, it is possible to select one with such a thickness that the durability as a substrate can be maintained. The thickness of the transparent substrate 10 may be at least 0.01 mm, at least 0.05 mm or at least 0.1 mm. Further, the thickness of the transparent substrate may be at most 10 mm, at most 5 mm, at most 0.5 mm, at most 0.3 mm, or at most 0.15 mm.

The first transparent layer 21 is preferably a transparent resin layer. As the transparent resin, an acrylic resin, an epoxy resin, a polycarbonate resin, a silicone resin, an unsaturated polyester resin or the like, may be mentioned. Each of the above-mentioned resins is preferably one type of a photocurable resin, a thermosetting resin and a thermoplastic resin. In a case where the video projecting structure 100 is formed in a window provided in a room or the like, the yellow index of the transparent resin is preferably at most 10, more preferably at most 5, in order to maintain clarity so as not to lose the function required for the window. The first transparent layer 21 has a transmittance of preferably at least 50%, more preferably at least 75%, further preferably at least 90%.

In Description, the transmittance is visible light transmittance, which means the proportion (percentage) of the total transmitted light transmitted to the opposite surface side, to the incident light entered at an incident angle of 0° from one surface of a video projecting structure. That is, it is a usual total light transmittance to be measured by the method described in JIS K 7361: 1997 (ISO 13468-1: 1996).

The first transparent layer 21 may be formed in layers. The first transparent layer may contain a filler. The refractive-index difference between adjacent layers when the first transparent layer is formed in layers, or the refractive-index difference between a filler and a resin layer as a binder is preferably within 0.05 in terms of minimizing the occurrence of turbidity, more preferably within 0.02 in terms of further increasing the transparency, further more preferably within 0.01 in terms of minimizing the reduction in rearward visibility similar to blur as in a halo.

The material for the resin layer used as the first transparent layer 21 in contact with the reflective film 30 has a water absorption rate of preferably at most 0.2 mass %. In Description, the water absorption rate may be measured by the following method.

The material for the resin layer is immersed in a solvent that allows the material to be dissolved, and the material is dissolved in the solvent to obtain a solution. Then, by a casting method, 10 g of the solution is put into a cup made of aluminum, the cup is heated at 110° C. for 5 minutes, and the solvent is removed, followed by leaving the cup at room temperature for 1 hour. After that, a solid substance is retrieved from the cup. An evaluation sample is collected in an amount of 1 g from the solid substance, and the moisture content (g) in the sample is measured by using a Karl Fischer device (CA-200 Moisturemeter: manufactured by API Corporation). The water absorption rate is found based on the measured moisture contents according to the following formula:

Water absorption rate (%)=(water content (g)×100)/ the mass of evaluation sample (g)

The second transparent layer 22 is preferably a transparent resin layer. The transparent resin may be formed of the same kind of material as the transparent resin of the first transparent layer 21. The second transparent layer 22 may be formed of the same kind of material as or a different kind of material from the first transparent layer 21, but is preferably formed of the same kind of material. The second transparent layer preferably has the same refractive index as the first transparent layer 21. When both layers are formed of the same kind of material, it is easy to set the refractive indexes of both layer at the same value. As in the first transparent layer 21, the second transparent layer 22 has a transmittance of preferably at least 50%, more preferably at least 75%, further preferably at least 90%.

The second transparent layer 22 may be formed in layers. The second transparent layer may contain a filler. The refractive-index difference between adjacent layers when the second transparent layer is formed in layers, or the refractive-index difference between a filler and a resin layer as a binder is preferably within 0.05 in terms of minimizing the occurrence of turbidity, more preferably within 0.02 in terms of further increasing the transparency, further more preferably within 0.01 in terms of minimizing the reduction in rearward visibility similar to blur as in a halo.

The material for the resin layer used as the second transparent layer 22 in contact with the reflective film 30 has a water absorption rate of preferably at most 0.2 mass %.

Each of the first transparent layer 21 and the second transparent layer 22 has a thickness of, e.g. 0.5 to 50 µm in the other portions (specifically between valley portions and the rear surface) than the portions with the irregularities formed therein.

The reflective film 30 may be formed by a single-layered or multilayered metal film or dielectric film, or a combination thereof. Part of light incident on the reflective film 30 is transmitted therethrough, and part of the remaining is reflected. The reflective film 30 is preferably formed of at least one material selected from the group consisting of a metal, a metal oxide, a metal nitride and a semiconductor. The reflective film 30 is more preferably formed of a metal material containing aluminum (Al) or silver (Ag). As an example, the reflective film 30 is a thin metal film, or a film having an oxide film, a thin metal film and an oxide film sequentially stacked in this order. The oxide film means a film of an oxide of a metal or a semiconductor. The metal thin film has a thickness of preferably 1 to 100 nm, more preferably 4 to 25 nm. Within such a range, it is possible to utilize the preferred functions as the reflective film as described above without interfering with the functions by irregularities formed on the surface of the first transparent layer 21.

The effects of the irregularities formed on the surface of the first transparent layer 21 of the present invention will be described. Light incident on a smooth surface (projection surface) does not substantially diffuse, whereby the regular reflectance is large, and the reflected light intensity rapidly diminishes if the angle is deviated from the regular reflection angle. In order to increase the reflected light intensity and to widen the viewing angle, irrespective of the place in the video projecting structure 100 or the position angle of an observer, it is preferred that the angles of the irregularity surface of the first transparent layer 21 on which the reflective layer 30 is formed, to the surface of the transparent substrate 10, be different.

In this embodiment, the irregularities may be formed in a regular pattern, an irregular pattern or a random pattern, or be formed in somewhat degree of similar shapes or a lens array shape under the condition that the above-mentioned formula (2) is met. Thus, it is possible to increase the reflected light intensity and to widen the viewing angle, irrespective of the place in the video projecting structure 100 or the position angle of an observer, in each of the x direction and the y direction. Further, the viewing angle in the x direction and the viewing angle in the y direction can be made different from each other as described above.

Figure 5:
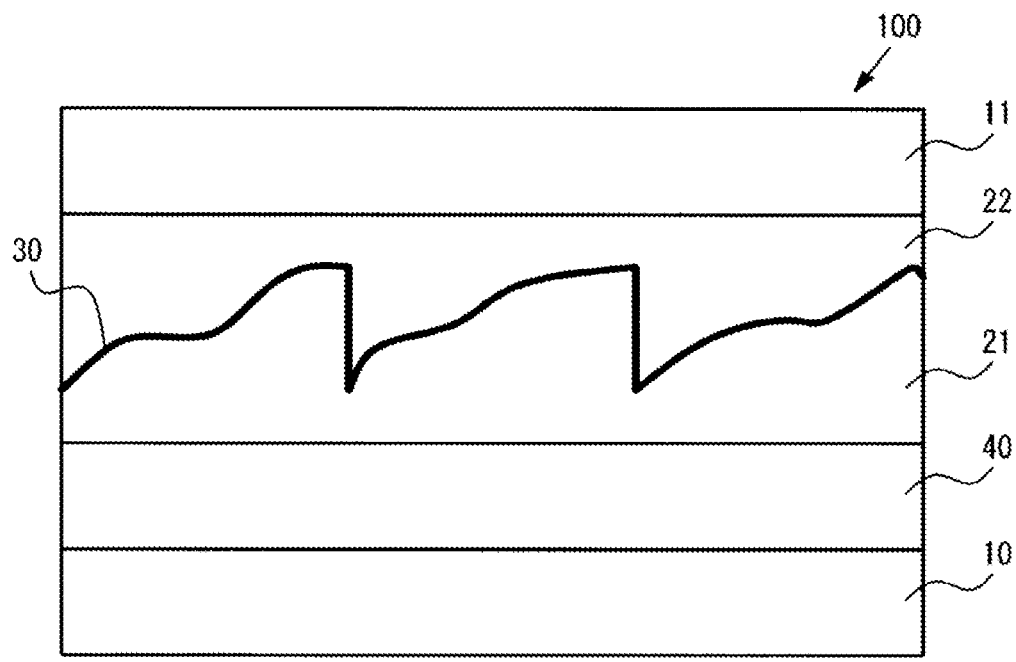
FIG. 5 is an explanatory view illustrating another example of the configuration of the video projecting structure.

FIG. 5 is a cross-sectional view of the video projecting structure 100 according to another example of the present invention. The video projecting structure 100 has a first transparent layer 21, a reflective film 30, and a second transparent layer 22 formed on a transparent film 40. Specifically, the video projecting structure is configured to have a transparent substrate 10 bonded to the transparent film 40 and a second transparent substrate 11 bonded to the second transparent layer 22. In this configuration, the first transparent layer 21, the reflective film 30 and the second transparent layer 22 are formed on the transparent film 40 without forming the first transparent layer 21 directly on the transparent substrate 10 formed of glass or the like. This allows the video projecting structure 100 to be produced by a low-cost manufacturing method, such as roll-to-roll. Although the transparent film 40 and the transparent substrate 10 are shown to be separate members for convenience sake in FIG. 5, the transparent film 40 may be regarded as an embodiment of the transparent substrate 10. Thus, the transparent film 40 may be made of the same kind of material as described in connection with the transparent substrate 10.

The transparent film 40 may be bonded to the transparent substrate 10 by use of a thermoplastic resin, such as PVB or EVA, an ionomer resin, an adhesive resin, an adhesive or the like. The transparent substrate 11 and the second transparent layer 22 may be bonded together by the same method. The video projecting structure may be configured without including the transparent film 40.

Figure 6:
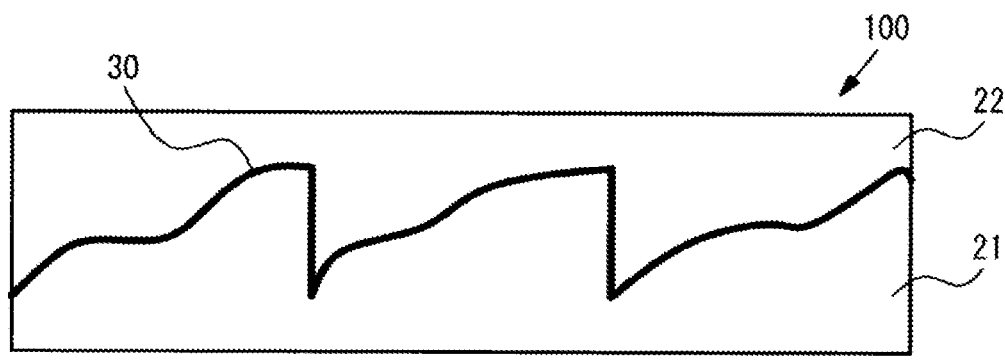
FIG. 6 is an explanatory view illustrating still another example of the configuration of the video projecting structure.

FIG. 6 is a cross-sectional view of the video projecting structure 100 according to still another example of the present invention. The video projecting structure 100 is configured to include only a first transparent layer 21, a reflective film 30, and a second transparent layer 22. Even when neither the transparent substrate 10 nor the second transparent substrate 11 are present, it is possible to widen the viewing angle and to improve the visibility of the entire projection surface as long as the surface shape of the irregularities formed on the first transparent layer 21 is made as described above.

Figure 7:
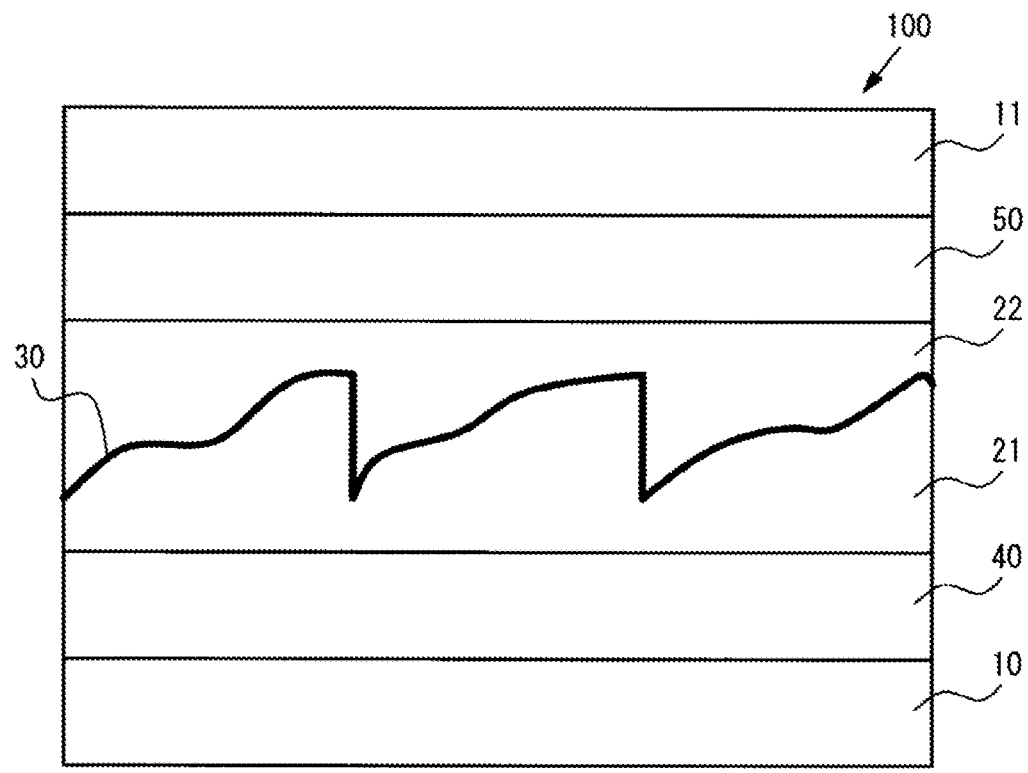
FIG. 7 is an explanatory view illustrating a different example of the configuration of a video projecting structure.

FIG. 7 is cross-sectional view of the video projecting structure 100 according to a different example of the present invention. The video projecting structure 100 is configured to have a first transparent layer 21, a reflective film 30 and a second transparent layer 22 formed on a first transparent film 40, the second transparent layer 22 having a second transparent film 50 bonded thereto, the first transparent film 40 having a first transparent substrate 10 bonded thereto, and the second transparent film 50 having a second transparent substrate 11 bonded thereto. In this configuration, it is easy to handle the layered member formed of the first transparent film 40, the first transparent layer 21, the reflective film 30, the second transparent layer 22 and the second transparent film 50. When the second transparent film 50 is bonded to the second transparent layer 22 before photocuring the second transparent layer 22, it is easy to promote curing the second transparent layer 22.

The video projecting structure 100 may be configured to have an area where a first transparent layer 21, a reflective film 30 and a second transparent layer 22 are formed such that a video is projected only on a specific portion of a transparent substrate 10. The area where such video projection is possible may be formed in an opening portion or a transparent peripheral portion of a glass plate.

(First Production Process for Video Projecting Structure)

Figure 8:
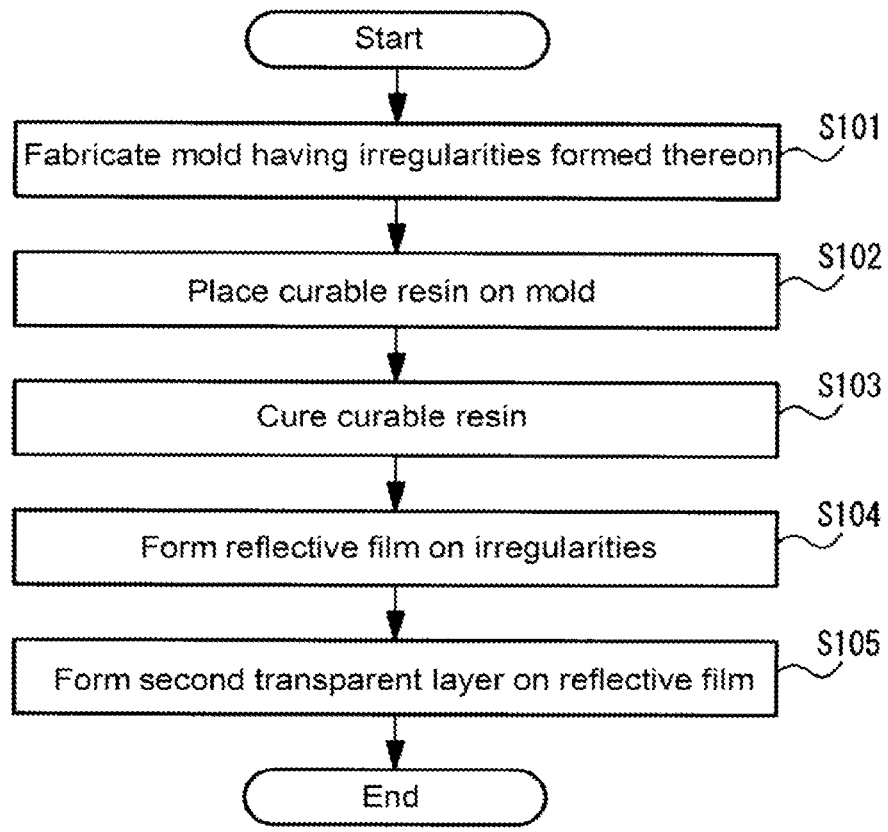
FIG. 8 is a flowchart illustrating a process for producing the video projecting structure.

Explanation will be made about an example of the process for producing a video projecting structure 100. FIG. 8 is a flowchart illustrating the process for producing the video projecting structure 100. FIGS. 9(A) to 9(D) are explanatory views illustrating the process for producing the video projecting structure. The explanation will be made about a case where the video projecting structure 100 configured as exemplified in FIG. 4 is produced.

Figure 9A:
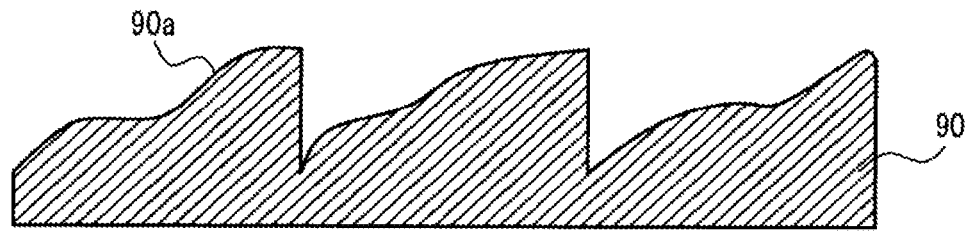
FIGS. 9(A) to 9(D) are explanatory views illustrating an example of the process for producing the video projecting structure.
Figure 9B:
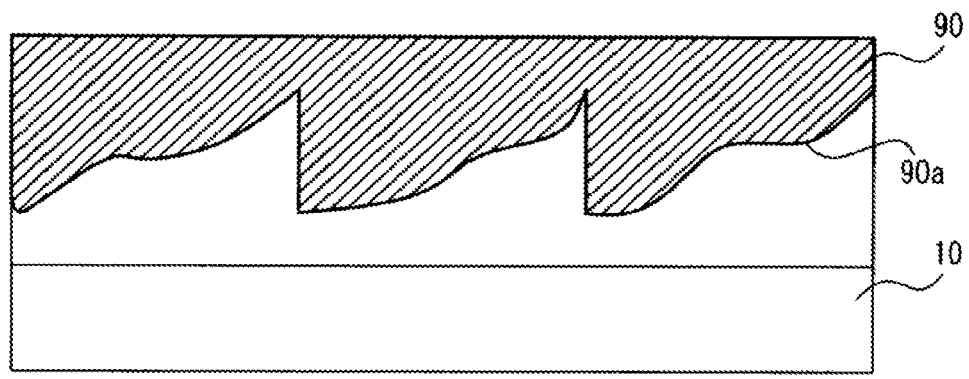

A mold 90 is prepared to have irregularities 90a formed thereon as illustrated in FIG. 9(A) (Step S101). The mold 90 has a surface formed in a plurality of slant surfaces 42 ranged as exemplified in FIG. 1. The irregularities 90a are formed on such a surface to exhibit irregularities as exemplified FIGS. 1 and 3(A) and (B).

The mold 90 may be, for example, a resin film having irregularities 90a formed thereon. The mold may be a white or black film having a matted surface, a glossy film, a release film, or a mold die having irregularities 90a formed thereon. A film having the irregularities 90a formed thereon is preferably one not subjected to easy adhesion treatment. The mold die or film having the irregularities 90a formed thereon is, for example, one obtained by grinding the surface of the material on which the irregularities 90a are to be formed, one having a surface molded by dry etching, wet etching, sandblasting, extrusion molding, laser machining or the like, one utilizing a surface structure formed by molding a mixed material, such as microparticles, or one having the irregularities 90a formed by, e.g., coating of a self-organizing material. As the laser machining process, thermal machining (melting) of a surface by use of a short pulse laser or the like and vaporizing a surface by non-thermal machining (abrasion) may be mentioned. It should be noted that the material for the mold die may be, for example, a Ni-based material, stainless steel, a Cu-based material, quartz, or glass. The surface with the irregularities 90a formed thereon may be subjected to release treatment.

Next, a transparent substrate 10, such as a glass substrate, is prepared, and a UV-curable resin (ultraviolet curable resin), which is the resin material for forming a first transparent layer 21, is applied to the transparent substrate 10 by die coating, spin coating, inkjet coating, spray coating or the like. Then, as illustrated in FIG. 9 (B), the mold 90 is placed onto the UV curable resin applied to the transparent substrate 10 (Step S102). The mold 90 is placed such that a surface of the mold with the irregularities 90a formed thereon is positioned on the UV curable resin. Thereafter, the UV curable resin is cured by irradiation with UV light (ultraviolet light) of preferably 200 to 10,000 mJ to form the first transparent layer 21 (Step S103). In a case where a first transparent layer 21 is to be formed of a thermosetting resin, the mold 90 is placed on the thermosetting resin, followed by curing the thermosetting resin by heating. Otherwise, in a case where the first transparent layer 21 is to be formed of a thermoplastic resin, the thermoplastic resin is heated, and the mold 90 is placed on the thermoplastic resin, followed by cooling to solidify the thermoplastic resin.

Then, the mold 90 is peeled from the first transparent layer 21. Thus, the surface of the first transparent layer 21 with the irregularities formed thereon is exposed.

Figure 9C:
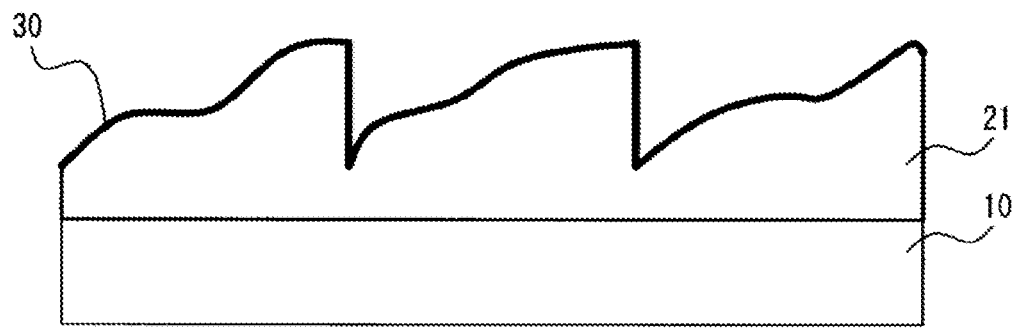

Then, as illustrated in FIG. 9(C), a reflective film 30 is formed on a surface of the first transparent layer 21 with the irregularities formed thereon (Step S104). The reflective film 30 may be formed by conducting vacuum deposition or sputtering to deposit, for example, an Al film on the surface with the irregularities formed thereon.

The reflective film 30 is formed so as to have a reflectance of preferably at least 5%, more preferably at least 15%, further preferably at least 30%. The reflective film 30 is preferably configured so as not to abruptly change its reflectance according to colors. When the typical light wavelengths of RGB are considered to be 630 nm, 530 nm and 465 nm, respectively, the ratio of the respective reflectance Log (common logarithm) values is preferably within a range of 0.5 to 2.

Figure 9D:
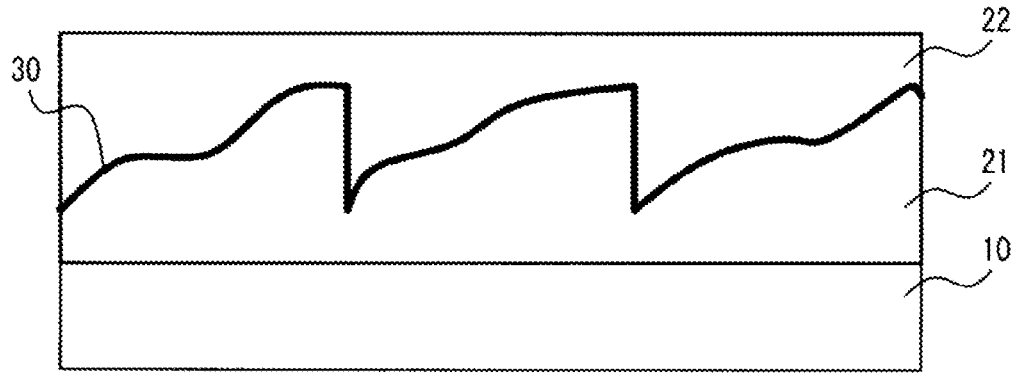

Then, as illustrated in FIG. 9(D), a second transparent layer 22 is formed on the reflective film 30 (Step S105). Specifically, a UV curable resin (ultraviolet curable resin) is applied to the reflective film 30 to form the second transparent layer 22 by die coating. Thereafter, the UV curable resin is irradiated with UV light (ultraviolet light) and cured to form the second transparent layer 22. Here, the second transparent layer 22 may be formed of a thermosetting resin or a thermoplastic resin.

In the first transparent layer 21 and the second transparent layer 22, the thickness of both layers other than the irregularity section (specifically portions between the valley portions and the rear surface) may be at least 0.5 μm, but in consideration of a roll-to-roll process to be used for its production, the thickness of both layers other than the irregularity section is preferably at most 50 μm. Further, the thickness of both layers other than the irregularity section is preferably at least twice the Ra value (arithmetic average roughness) of the irregularities because it is possible to secure a sufficient thickness to inhibit, for example, shrinkage during molding.

(Second Production Process for Video Projecting Structure)

Figure 10:
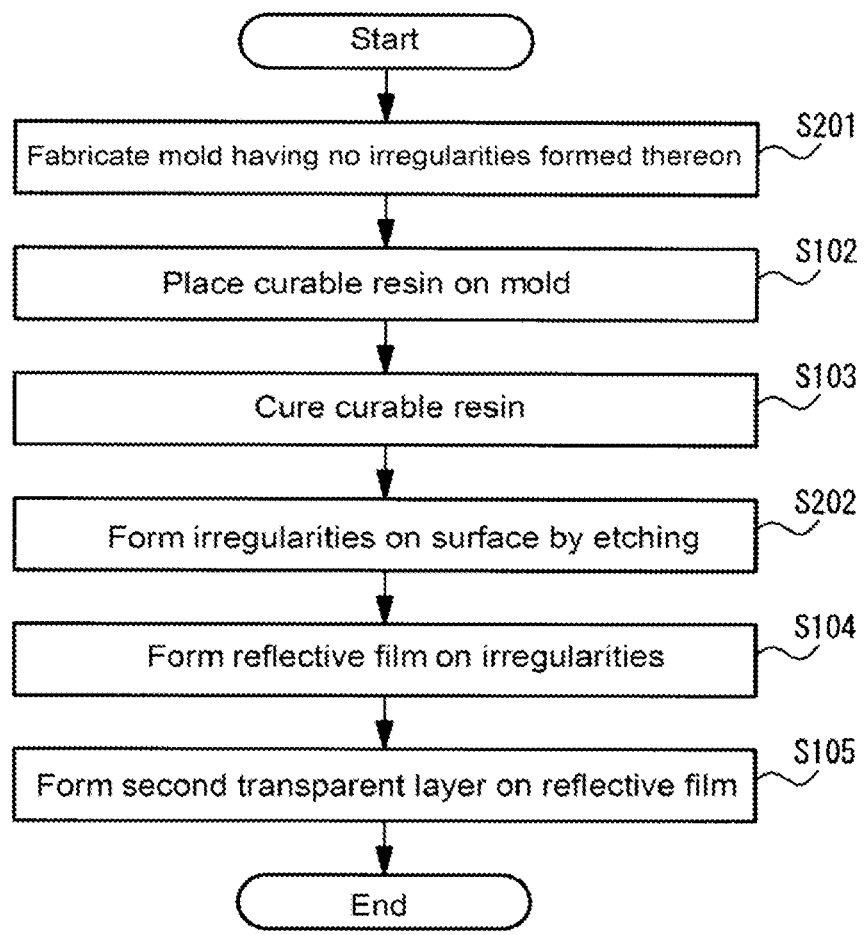
FIG. 10 is a flowchart illustrating another example of the process for producing the video projecting structure.

Explanation will be made about a different example of the process for producing a video projecting structure 100. FIG. 10 is a flowchart illustrating the different example of the process for producing the video projecting structure 100. Explanation will be made about a case where the video projecting structure 100 configured as exemplified in FIG. 4 is produced.

As in the first production process, a mold 90 is prepared (Step S201). It should be noted that although the mold 90 has a surface formed so as to have a plurality of slant surfaces 42 ranged as exemplified in FIG. 1, the mold has no irregularities 90a formed on the surface.

Next, as in the first production process, a resin material for forming the first transparent layer 21 is applied to a transparent substrate 10, and the mold 90 is placed onto a curable resin applied to the transparent substrate 10 (Step S102). Then, as in the first production process, the curable resin is cured (Step S103).

Irregularities similar to the irregularities 90a as in the first production process are formed on a first transparent layer 21 by an etching process (Step S202). As the etching process, either a physical etching process or a chemical etching process is applicable. In the etching process, a patterned resist may be formed on the first transparent layer 21 to form the irregularities by a photolithography process. An etching process, such as sandblasting from a specific direction, may be performed to provide the irregularities with anisotropy being exhibited based on the blasting direction. During this process, a resin filler or the like is put into the first transparent layer 21 to readily exhibit the anisotropy, or the etching amount during blasting may be controlled.

Then a reflective film 30 is formed on a surface of the first transparent layer 21 with the irregularities formed thereon as in the first production process (Step S104). After that, a second transparent layer 22 is formed on the reflective film 30 as in the first production process.

As described above, the video projecting structure 100 includes the first transparent layer 21 with the irregularities formed thereon, the reflective film (reflective layer) 30 formed on a surface of the first transparent layer 21, and the second transparent layer 22 formed on the reflective film 30, wherein when a surface of the first transparent layer 21 opposite to the reflective film 30 is defined as a reference surface (rear surface 41), the reflective film 30 is slant to the reference surface, the reflective film has a plurality of slant surfaces 42 reflecting a light from a video, wherein when the extending direction of the slant surfaces 42 perpendicular to a normal direction of the reference surface is defined as a first direction (for example, the y direction illustrated in FIG. 1), when the direction which is perpendicular to the first direction and in which the slant surfaces 42 are arrayed is defined as a second direction (for example, the x direction illustrated in FIG. 1), and when the direction in which the slant surfaces 42 have the average slant angle θ to the reference surface in section in the second direction is defined as a third direction (for example, the y' direction illustrated in FIG. 3), the irregularities formed on the first transparent layer are formed such that the average spacing $Sm_2$ of the irregularities in the second direction is larger than the average spacing $Sm_1$ of the irregularities in the first direction while the average spacing $Sm_3$ of the irregularities in the third direction is larger than the average spacing $Sm_1$ of the irregularities in the first direction, whereby not only transparency but also high visibility of a video are achieved, and the viewing angle in the first direction and the viewing angle in the second different can be made different from each other.

When the video projecting structure 100 forms a wide screen as one example, the video projecting structure 100 is also applicable to an application where an observer moving in a longitudinal direction of the screen is provided with a screen video, without reducing the visibility during movement, since the viewing angle in the first direction and the viewing angle in the second different can be made different from each other. When the video projecting structure 100 is applied to such an application, the viewing angle is preferably controlled such that the viewing angle in the horizontal direction seen from the observer does not become larger than the viewing angle in the vertical direction, for example.

The video projecting structure 100 according to the present invention may be also defined as follows:

When the surface of the first transparent layer 21 opposite to the reflective layer (reflective film) 30 is defined as a reference surface, there are an A direction in which the average spacing Sm of the irregularities on the first transparent layer is maximum (for example, the y direction illustrated in FIG. 1) and a B direction orthogonal to the A direction and parallel to the reference surface (for example, the x direction illustrated in FIG. 1), and the average spacing $Sm_A$ of the irregularities in the A direction is larger than the average spacing $Sm_B$ of the irregularities in the B direction.

Further, the frequency distribution of inclinations of the irregularities in the A direction to the reference surface will be considered. Respective minute sections (for example, 1 mm) in the A direction are considered as measuring sections to see the frequency distribution. When the frequency distribution is graphed (for example, bar-graphed), the horizontal axis represents measured angles (provided that the scale is graduated in, for example, 0.25° divisions) while the vertical axis represents frequencies of the respective angles. It should be noted that the graduation of 0.25° divisions means that when a measured angle is within a range of 1 to 1.25°, the measured angle is classified into 1° for example.

The absolute value of the middle value (median value) in the frequency distribution is a value not 0°. The absolute value is preferably at least 3°. In a case where the absolute value is at least 3°, when the video projecting structure 100 is used as a screen such that a video is projected on the intersection between the screen, and a plane including a projector and an observer, it is possible to avoid a case where video projection cannot be made in such a range because the observer is placed in a state to see regular reflected light.

Although explanation has been made about a case where the irregularity shape is formed by blasting treatment, the irregularity shape may be formed by application of a coating agent. The coating agent used in the formation of the irregularity shape may be one having a property that irregularities are formed in a dry step by, for example, the self-organization of surface shape, or one including particles having anisotropy. A coating agent may be applied to the irregularities formed by imprinting or after blasting treatment to control the irregularity shape.

The A direction and the B direction may be determined by simulation or based on measurement results of the surface shape of the video projecting structure 100 by use of a certain measuring instrument (such as white light interferometer). Here, a concept of a projected portion of the video projecting structure 100 will be introduced. When it is assumed as one example that projection is made from a single or a plurality of projectors, the projected portion is a region on the video projecting structure 100 where videos from all of the projector are projected.

For example, consideration will be made using first data that is obtained by using a low pass filter having a cut-off frequency of, for example, 100 µm to remove longer ones among the cycles of the irregularities (wavy shape) in the surface shape of the projected portion of the video projecting structure 100 (data showing the wavy shape after removing longer cycles of irregularities) and a second data that is obtained without using the low pass filter (data showing the wavy shape before removing longer cycles of irregularities).

The directions in which the average spacing Sm of the irregularities on the surface is maximum in arbitrary plural regions (each having 1 mm², for example) of the projected portion of the video projecting structure 100 are determined based on the first data. The determined directions could be present in the number of the regions. The A direction is determined so as to meet condition (a) where the absolute value of the difference between the value of an angle AR and the median value of the angles AR measured in all of the regions of the projected portion is within 10°, the angles AR being formed between the A direction being measured after removal of the wavy shape at plural positions on the projected portion and one direction defined in a plane perpendicular to the normal direction of the reference surface in regions occupying at least 80% of the area of the projected portion of the video projecting structure 100.

It should be noted that the wording "arbitrary plural regions" is, for example, regions including directions in which the average spacing Sm of irregularities on the surface are estimated to be large.

The directions in which the average spacing Sm of the irregularities on the surface is maximum in arbitrary plural regions of the projected portion of the video projecting structure 100 are determined based on the second data. The determined directions could be present in the number of the regions. The A direction is determined so as to meet condition (b) where the absolute value of the difference between the value of an angle BR and the median value of the angles AR measured in all of the regions of the projected portion is not within ±20°, the angles BR being formed between the B direction being measured before removal of the wavy shape at plural positions on the projected portion and one direction defined in a plane perpendicular to the normal direction of the reference surface in regions occupying at least 30% of the area of the projected portion of the video projecting structure 100.

The direction determined based on the first data is determined as the A direction of the first date while the direction determined based on the second data is determined as the A direction of the second date.

Although the low pass filter having a cut-off frequency of 100 μm is used in the above-mentioned example, a low pass filter having a cut-off frequency of, for example, 40 μm may be used to determine the A direction as in the above-mentioned example.

A low pass filter having a cut-off frequency of 15 μm may be used to determine the A direction as in the above-mentioned example.

An approach similar to the above-mentioned approach is applied to the B direction as well.

Next, uses (applications) of the video projecting structure 100 according to the above-mentioned embodiments will be described.

As a window in a structure, such as a building, the following applications may be mentioned:
  display at a showcase for a product or the like, a display case for an art object, an animal or the like, a building or a showroom
  display at the interior of a living room space, display of a CM video and an educational video
  display of an advertisement by a system to perform projection from the inside of a building
  display of information, an advertisement or the like at a car dealer
  display of an advertisement, a movie or a modified exterior design at a small triangular window or a fixed window of a building, in particular, in an upper portion of such a window
  display of an advertisement on a glass door of a supermarket, a retail store or a public building, information notification, or use in an event or the like
  display of growth information or the like at a structural material of a greenhouse or the like
  use of a glass wall on which a wallpaper pattern is modifiable
  a stadium screen board or backboard in a studio
  a partition of a bathroom in a hotel or the like
  use as a switchable privacy screen on which a proper video is projected or not projected by irradiation or non-irradiation of light (in order to improve security during non-operation of the privacy filter by allowing an observer to clearly see a scene behind the filter during non-irradiation of light in, in particular, a meeting room, a hospital, a bank building, a restaurant, and a public facility)
  display of a letter, a sign, an image or a motion picture at an airport, a station, a hospital and a school
  display of information on a local area or sightseeing at a religious facility, such as a temple, a shrine or a church
  spatial performance at a commercial facility
  projection mapping
  display of a letter, a sign, an image and a motion picture at a stadium
  use for projecting information at a kitchen and personalized video projection
  use as a whiteboard to serve as a member to write or display at a school or a meeting room, and use of such a member along with a user interface
  use in the double glazing of insulating glass to serve as a door of a refrigerator at a supermarket or a convenience store As the applications for a tabletop, a casing or the like, the following applications may be mentioned;
  a tabletop at a restaurant
  a counter at a hotel, a bank, a sushi restaurant or the like
  a desk (desktop) and a kitchen counter
  a partition on a desk
  a showcase on a floor for foodstuff in a department store
  a showcase or a fitting room in an apparel boutique
  a wall for a kitchen, a living room or the like
  a vending machine
  a partition in a pachinko parlor or the front glass of a pachinko machine (which is transparent during play to allow a player to play on the machine as usual, and which displays an advertisement of the parlor on the front glass when the machine is vacant such that nobody plays on the machine)

Further, by placing another display device behind the video projecting structure according to the present invention, it is possible to display a video with depth or to display a video of different movement as superimposed.

Further, as use for a vehicle, the following applications may be mentioned.
  In a railway vehicle,
  window glass on the back side of a driver's cab (preventing lamps in a passenger room from reflecting during running in the underground)
  information display on a side window glass for a railway hung advertisement
  a partition in a passenger room on a bullet train
  a window glass for a linear motor car
  applying of a screen function to a window for a railway vehicle (in particular, increasing visibility after sunset or the like)
  In an automobile or the like,
  display at a shade portion of a windshield
  information display at an automobile windshield
  installment at a side glass for an automobile to display information or a video
  display of information or a video at an inner partition of a taxi or a limousine bus, inner advertisement in a bus (backside of a driver's seat) sun visor for an automobile
  display of a video of TV or DVD as an in-vehicle partition in a minivan or a an SUV
  display of "Watch out!" or another representation at a door glass when opening the side door installment at a rear windshield to display to serve as a backlight or a HMSL (High Mount Stop Lamp), information display for rear vehicles, destination display for a bus or the like around a dashboard a screen for a door glass Now, explanation will be made about examples where the video projecting structure 100 is incorporated into the windshield of an automobile as a specific application.

Figure 11:
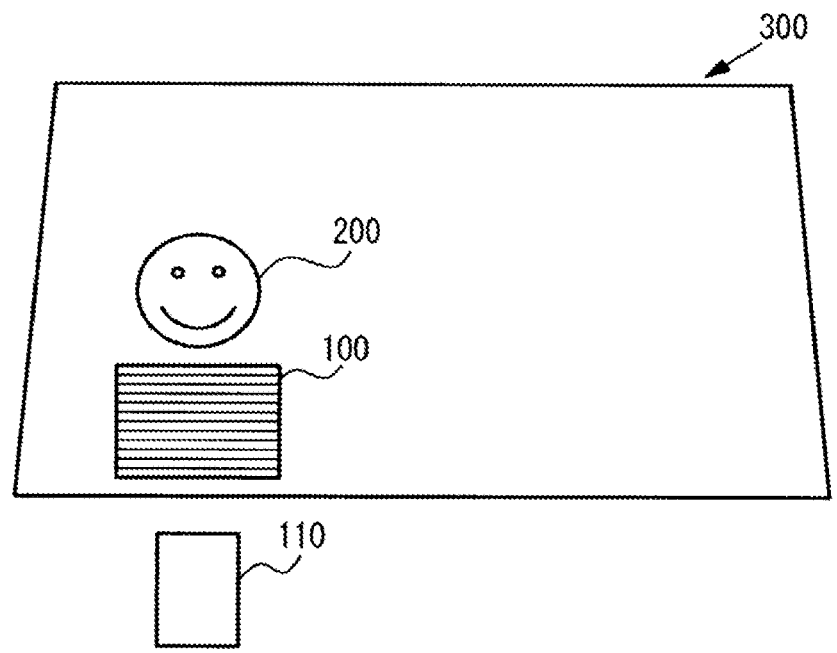
FIG. 11 is an explanatory view illustrating an example of the positional relationship among the video projecting structure, a projector and an observer seen from a front side of a vehicle.

FIG. 11 is an explanatory view illustrating an example of the positional relationship among the video projecting structure 100, a projector 110 and an observer 200 as seen from a front side of the vehicle. The video projecting structure 100 is disposed at a the windshield of the vehicle. The transparent screen made of the video projecting structure 100 is disposed at a lower portion of the window. The projector 110 is disposed at a lower position than the window. The observer 200 has his or her eyes positioned at a level corresponding to a central portion of the window in a vertical direction. In this case, each of the slant surfaces 42 is formed in a transverse stripe shape elongated in a substantially horizontal direction as illustrated in FIG. 11. In other words, the x direction illustrated in FIG. 1 is the transverse direction in FIG. 11.

Figure 12:
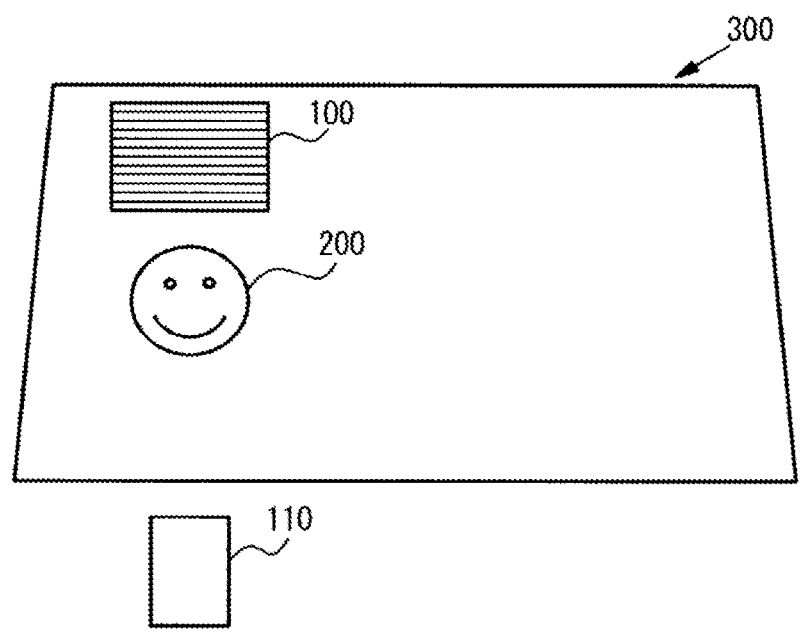
FIG. 12 is an explanatory view illustrating another example of the positional relationship among the video projecting structure, the projector and the observer seen from the front side of the vehicle.

FIG. 12 is an explanatory view illustrating another example of the positional relationship among the video projecting structure 100, the projector 110 and the observer 200 as seen from a front side of the vehicle. The video projecting structure 100 is disposed at the windshield of the vehicle. The transparent screen made of the video projecting structure 100 is disposed at an upper portion of the window. The projector 110 is disposed at a lower position than the window. The observer 200 has his or her eyes positioned at a level corresponding to a central portion of the window in a vertical direction. In this case as well, each of the slant surfaces 42 is formed in a transverse stripe shape elongated in a substantially horizontal direction as illustrated in FIG. 12.

Figure 13:
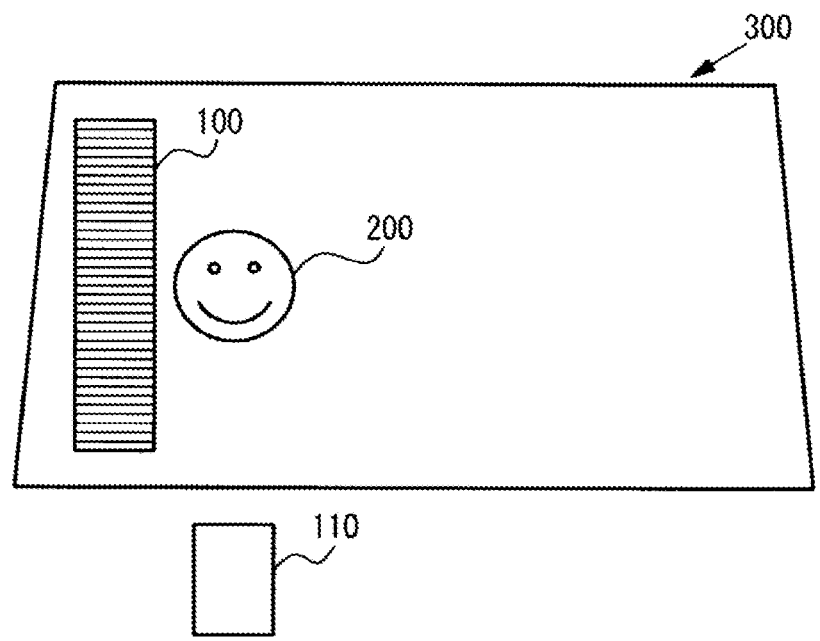
FIG. 13 is an explanatory view illustrating still another example of the positional relationship among the video projecting structure, the projector and the observer seen from the front side of the vehicle.

FIG. 13 is an explanatory view illustrating still another example of the positional relationship among the video projecting structure 100, the projector 110 and the observer 200 as seen from a front side of the vehicle. The video projecting structure 100 is disposed in at the windshield of the vehicle. The transparent screen made of the video projecting structure 100 is disposed at a left end portion of the window in its vehicle width direction. The projector 110 is disposed at a lower position than the window. The observer 200 has his or her eyes positioned at a level corresponding to a central portion of the window in a vertical direction. In this case, each of the slant surfaces 42 is formed in a transverse stripe shape elongated in a substantially horizontal direction as illustrated in FIG. 13.

Figure 14:
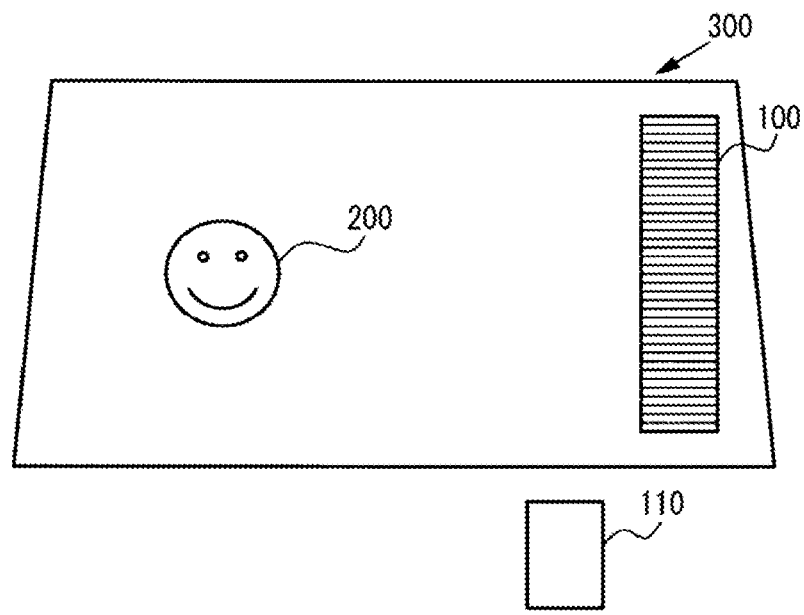
FIG. 14 is an explanatory view illustrating a different example of the positional relationship among the video projecting structure, the projector and the observer seen from the front side of the vehicle.

FIG. 14 is an explanatory view illustrating further another example of the positional relationship among the video projecting structure 100, the projector 110 and the observer 200 as seen from a front side of the vehicle. The video projecting structure 100 is disposed at the windshield of the vehicle. The transparent screen made of the video projecting structure 100 is disposed at a right end portion of the window in its vehicle width direction. The projector 110 is disposed at a lower position than the window. The observer 200 has his or her eyes positioned at a level corresponding to a central position of the window in a vertical direction. In this case, each of the slant surfaces 42 is formed in a transverse structure shape elongated in a substantially horizontal direction as illustrated in FIG. 14.

Figure 15:
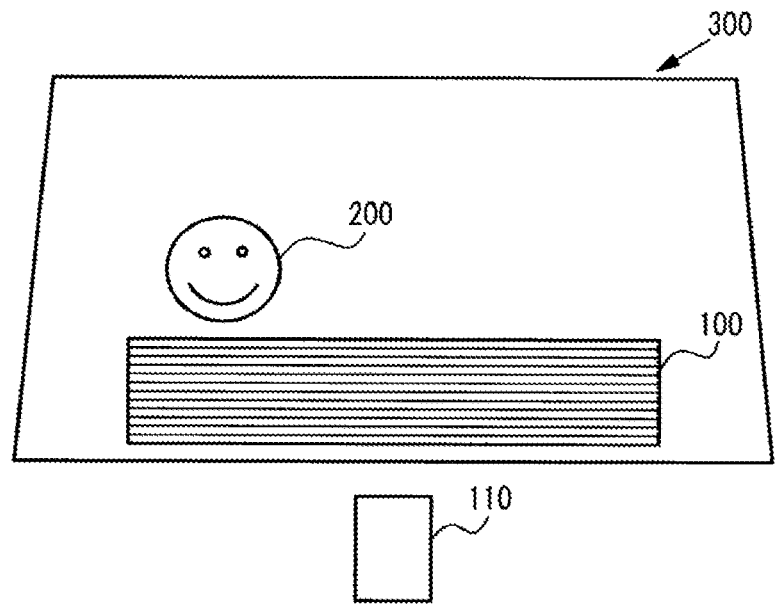
FIG. 15 is an explanatory view illustrating another different example of the positional relationship among the video projecting structure, the projector and the observer seen from the front side of the vehicle.
Figure 16:
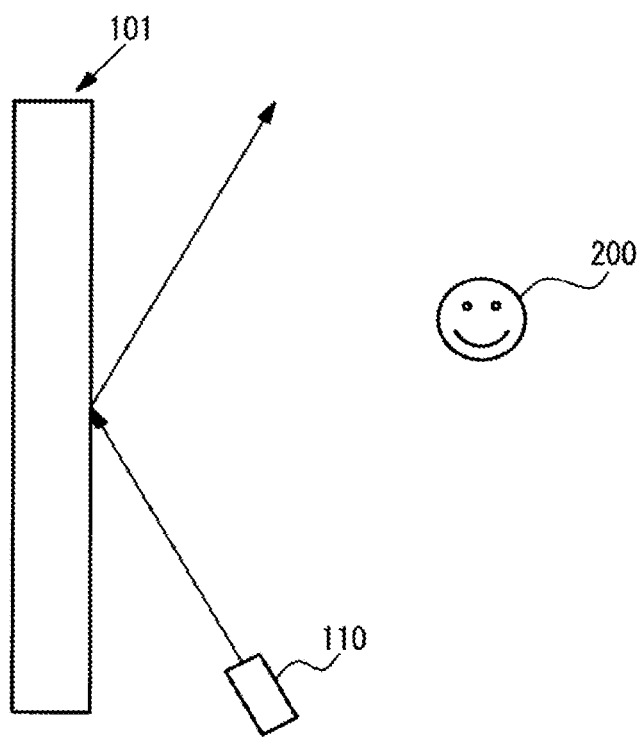
FIG. 16 is an explanatory view for illustrating the usage of the video projecting structure.
Figure 17:
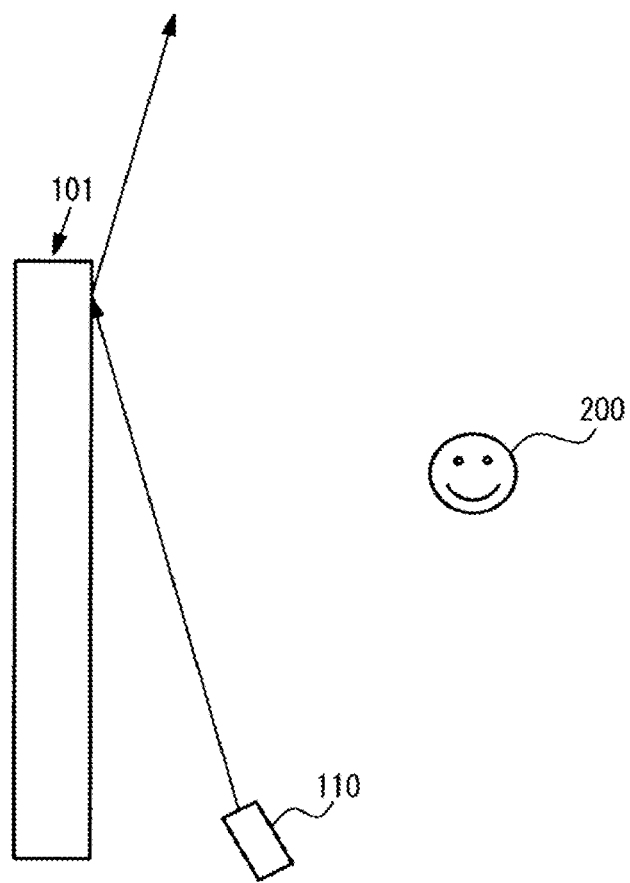
FIG. 17 is an explanatory view for illustrating the usage of the video projecting structure.
Figure 18:
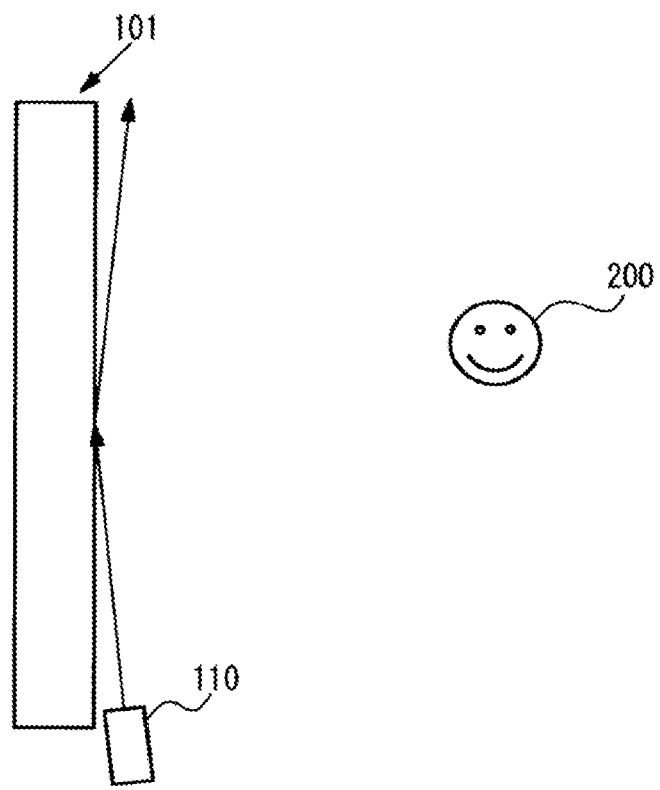
FIG. 18 is an explanatory view for illustrating the usage of the video projecting structure.
Figure 19:
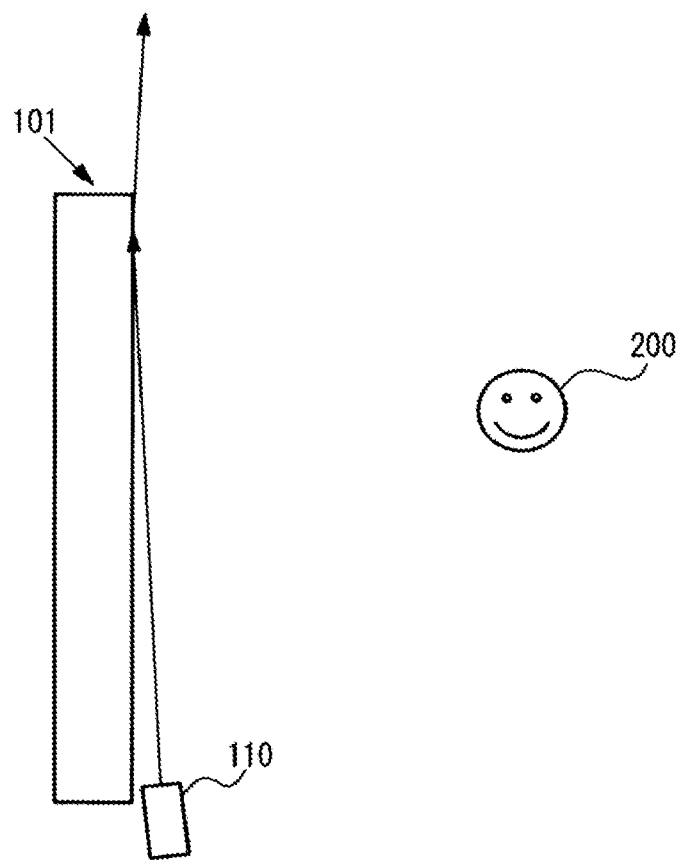
FIG. 19 is an explanatory view for illustrating the usage of the video projecting structure.

FIG. 15 is an explanatory view illustrating a still further example of the positional relationship among the video projecting structure 100, the projector 110 and the observer 200 as seen from a front side of the vehicle. The video projecting structure 100 is disposed at the windshield of the vehicle. The transparent screen made of the video projecting structure 100 is disposed at a lower portion of the window. In this case, the video projecting structure 100 is a transversely extended one. The projector 110 is disposed at a lower position than the window. The observer 200 has his or her eyes positioned at a level corresponding to a central portion of the window in a vertical direction. In this case, each of the front surfaces 42 is formed in a transverse stripe shape elongated in a substantially horizontal direction as illustrated in FIG. 15.

In each of FIGS. 11 to 15, the projector 110 may be present at any position around the window and may be disposed at an upper position or the like. Further, a plurality of projectors 110 or a plurality of video projecting structures 100 may be present. In each of FIGS. 11 to 15, the video projecting structure 100 may be disposed at a central portion of the window. The window with the video projecting structure 100 disposed may be, for example, a side window, a back window, a roof window or the like, instead of a windshield. When the window with the video projecting structure 100 disposed thereat is a side window, the projector 110 may be disposed at a position around the window frame of the side window (such as a position near to the side door or a handrail) inside the vehicle. The video projecting structure 100 may be equipped with a combiner for an HUD (head-up display) instead of a window. The combiner is usually disposed between a windshield and a driver's seat.

It should be noted that each of the slant surfaces 42 may be formed in a plurality of concentric stripes as in a Fresnel lens, seen from a normal direction of the rear surface (reference surface) 41, instead of being formed in stripes elongated in the x direction, in the video projecting structure 100. In this case, when the shape of a Fresnel lens is designed such that a video projected from the projector 110 gathers toward the observer 200, the Fresnel lens should be disposed to keep the concentric center out of the projection area.

In this case, the inclination of each of the slant surfaces is required to be set to an angle not greater than the scattering angle.

In this case, when the video projecting structure 100 is formed in the shape of a Fresnel lens in FIG. 15 for example, the viewing angle can be controlled such that the viewing angle in the horizontal direction and the viewing angle in the vertical direction can be also controlled to be 60° to 80° and 10° to 20°, respectively, as seen from the observer. When the viewing angle in the horizontal direction is set to 60° to 80°, a plurality of persons in the vehicle can see a video. When the viewing angle in the vertical direction is set to 10° to 20°, it is possible to maintain the brightness of a video at a high level. Both cases are preferred.

Although explanation about the above-mentioned embodiments has been made on the assumption that the respective slant surfaces 42 have the same width (length in the y direction) as each other, the respective slant surfaces may have different widths. The slant surfaces may have different slant angles from position to position. The slant surfaces may tend to be smaller or larger slant angles as being away from, in particular, the projector. The tendency of the slant angles to vary may be a tendency of the slant angles to change while fluctuating. The edge 44 of each slant surfaces 42 may be formed in a straight line or formed in a curved line.

EXAMPLES

Now, the present invention will be described in detail in reference to examples. The present invention should not be construed to be limited to the following examples. It should be noted that Examples 1 to 3 and 5 to 8 are working examples of the present invention while Example 4 is a comparative example.

[Fabrication of Molds 90]

Mold A

A mold die A (made of nickel chromium) was prepared to have a plurality of slant surfaces formed in a saw tooth shape (having the average slant angle θ of 14° to the reference surface, a width W of 40 μm and a height difference H of about 10 μm) in a cross-sectional view on one surface. Then the slant surfaces were subjected to laser abrasion, obtaining a mold A having irregularities 90a formed on the surface.

Mold B

A substrate sheet (PET film having a thickness of 0.075 mm) was prepared to have a plurality of slant surfaces formed in a saw tooth shape (having the average slant angle θ of 14° to the reference surface, a width W of 40 μm and a height difference H of about 10 μm) in a cross-sectional view on one surface.

Then a dispersion liquid with alumina particles having an average major axis of 1.6 μm and an average minor axis of 0.6 μm dispersed in an acrylic resin composition (alumina particles: 10 mass %, acrylic monomer: 50 mass %, PGMEA (propylene glycol monomethyl ether acetate) solvent: 40 mass %) was prepared. MEK was added, as a dilution solvent, to the dispersion liquid to dilute the dispersion liquid by five times, preparing a coating liquid B. By die coating, the coating liquid B was applied, in one direction, to a surface of the substrate sheet with the slant surfaces formed thereon, followed by drying the coating liquid B in an oven at 80° C. for five minutes. Then UV light of 1,000 mJ was applied on the surface with the coating film formed thereon to cure the acrylic resin, obtaining a mold B having irregularities 90a formed thereon.

Mold C

A coating liquid C was prepared, using alumina spherical particles having the average particle size of 0.6 μm, instead of the alumina particles used in the coating liquid B. A mold C having irregularities 90a formed thereon was obtained in the same way as the mold B except that the coating liquid C was used instead of the coating liquid B.

Mold D

As a mold 90 having irregularities 90a formed thereon, a mold die D (made of nickel chromium) was prepared to have a plurality of slant surfaces formed in a saw tooth shape so as to exhibit stripes (width W: 40 μm) in a concentric pattern (the shape of a Fresnel lens). A mold D was obtained so as to have the irregularities 90a formed thereon in the same way as the mold A except that the mold die D was used instead of the mold die A.

[Fabrication of First Transparent Layer]

A composition containing a UV-curable acrylic resin to form a first transparent layer was applied to a transparent film 40 (PET film having a thickness of 0.075 mm) by die coating to obtain a precursor layer for the first transparent layer.

Then the molds A to D as the molds 90 were placed on the precursor layer for the first transparent layer such that surfaces of the molds with the irregularities 90a formed thereon were brought into contact with the precursor layer for the first transparent layer. UV light of 1,000 mJ was applied to the precursor layer for the transparent layer from the opposite side of the molds 90 with respect to the precursor layer for the first transparent layer in this state to cure the UV-curable acrylic resin in the precursor layer for the first transparent layer in order to form the respective first transparent layers 21.

After that, the molds 90 were removed, obtaining laminates, each of which had a first transparent layer 21 formed on the transparent film 40 so as to have slant surfaces 42. Here, the irregularities 90a of the molds 90 were transferred on the slant surfaces 42.

[Fabrication of Reflective Layer]

By sputtering, reflective layers 30 were formed on the slant surfaces 42 having the irregularities 90a thus obtained. Specifically, each of the reflective layers 30 was formed so as to include an $InZnO_2$ layer (having a thickness of 10 nm), an AgBiNd layer (having a thickness of 10 nm) and an $InZnO_2$ layer (having a thickness of 50 nm) in this order. Each of the reflective layers 30 has a total thickness of 70 nm.

By die coating, a composition containing an UV-curable acrylic resin to form a second transparent layer was applied to the respective layers 30, obtaining precursor layers for the second transparent layers. UV light having 1,000 mJ was applied to the precursor layers for the second transparent layers in this state to cure the UV curable acrylic resin in the precursor layers for the second transparent layers in order to form second transparent layers 22. Thus, video projecting structures 100 were obtained.

Example 1

The mold A was used to fabricate a first transparent layer, a reflective layer and a second transparent layer in this order, obtaining the video projecting structure in Example 1.

Example 2

The video projecting structure in Example 2 was obtained in the same way as Example 1 except that the mold B was used.

Example 3

The video projecting structure in Example 3 was obtained in the same way as Example 1 except that the processing conditions for the laser abrasion performed in the fabrication process of the mold A were changed.

Example 4

The video projecting structure in Example 4 was obtained in the same way as Example 1 except that the mold C was used.

Example 5

The video projecting structure in Example 5 was obtained in the same way as Example 1 except that the mold D was used. In this example, a portion of the video projecting structure apart from the concentric center of the Fresnel lens by a distance of 300 mm in the horizontal direction (region A) and a portion of the video projecting structure apart from the concentric center of the Fresnel lens by a distance of 300 mm in the vertical direction (region B) were cut out, and evaluation was performed on both regions. The evaluation results of the region A are shown in Table 1. The evaluation results of the region B were the same as the evaluation results of Example 1.

Example 6

The video projecting structure in Example 6 was obtained in the same way as Example 1 except that the processing conditions of the laser abrasion performed in the fabrication process for the mold A were changed.

Example 7

The video projecting structure in Example 7 was obtained in the same way as Example 1 except that the processing conditions of the laser abrasion performed in the fabrication process for the mold A were changed.

Example 8

The video projecting structure in Example 8 was obtained in the same way as Example 1 except that the processing conditions of the laser abrasion performed in the fabrication process for the mold A were changed.

[Method and Device for Measuring Various Physical Properties]

Various physical properties and the visibility of the video projecting structures obtained in Examples 1 to 8 are shown in Table 1. The various physical property values of the irregularities are the values that were measured by applying a low-pass filter having a cut-off frequency of 40 μm, to the surfaces of the video projecting structures obtained in Examples 1 to 8.

In each of Examples 1 to 8, the direction in which the average spacing Sm of the irregularities on the slant surfaces of the first transparent layer 21 is maximum in a direction perpendicular to the normal direction of the reference surface is a direction in which the plural slant surfaces were arrayed, in other words, the direction of the width W in each of the molds A to D. From this point of view, the direction of the width was defined as a second direction. Next, the direction orthogonal to the second direction and parallel to the reference surface was defined as a first direction. Further, the direction in which the slant surfaces had the average slant angle θ to the reference surface in cross-section in the second direction was defined as a third direction.

The method and device for measuring the various physical properties were as follows:

<Median Value>

The frequency distributions of the inclinations of the irregularities in the second direction to the reference surface were measured in 0.25° divisions in every distance of 1 mm such that the frequencies were represented as distances. In this way, the median values were obtained.

<Brightness Measuring System>

Figure 20:
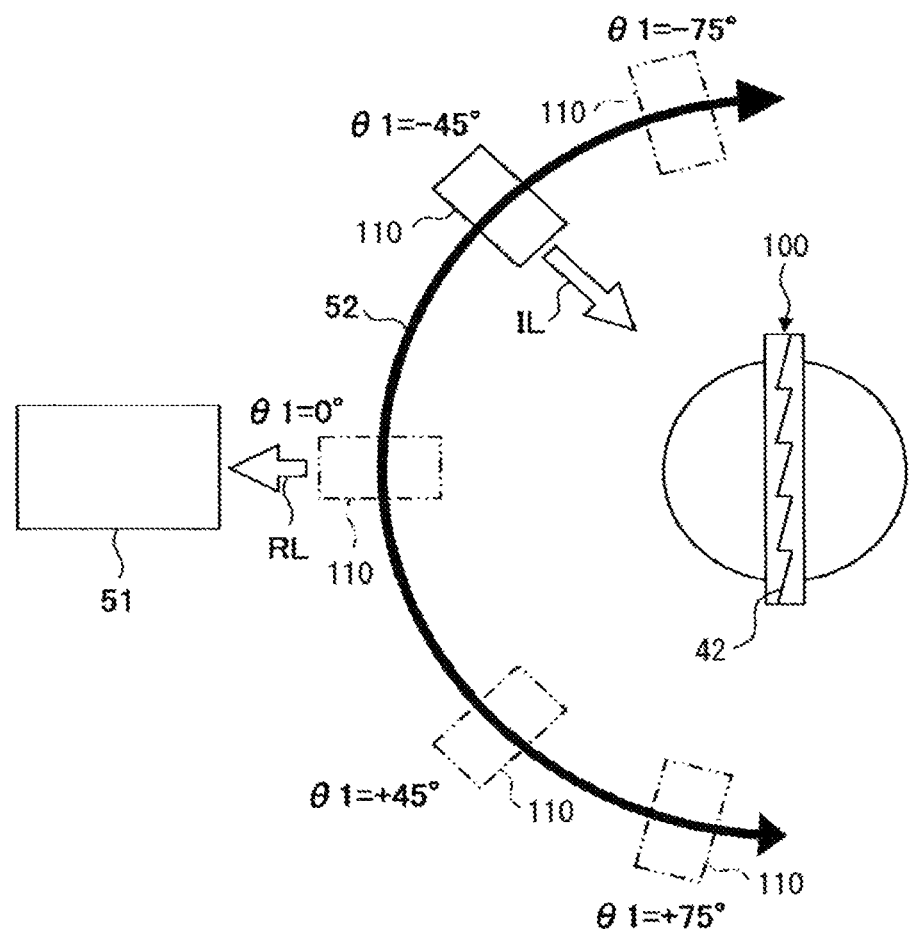
FIG. 20 is a view illustrating an example of a measuring system for measuring the relationship between the incident angle of incident light and the brightness of a video projecting structure with the outgoing angle of reflected light being kept constant.

FIG. 20 is a view illustrating an example of a measuring system for measuring the relationship between the incident angle of incident light IL and the brightness of the video projecting structure 100 with the outgoing angle of reflected light RL being kept constant. The incident angle means the slant angle of incident light in its incident direction, to the normal direction of a projection surface. When the incident direction of incident light aligns with the normal direction of the projection surface, the incident angle is 0°. The outgoing angle means the slant angle of outgoing light in its outgoing direction, to the normal direction of the projection surface. When the outgoing direction of outgoing light aligns with the normal direction of a projection surface, the outgoing angle is 0°.

As illustration in FIG. 20, reflected light RL of incident light IL incident on the video projecting structure 100 is received by a brightness measuring device 51 to measure the brightness of the video projecting structure 100. The brightness measuring device 51 is fixed at a position to face the front surface of the video projecting structure 100. The video projecting structure 100 is also fixed. In contrast, a projector 110 is disposed so as to be revolvable along an arced passage 52 such that the incident angle 81 of the incident light IL can be changed. In this case, the outgoing angle θ2 of the reflected light RL is kept constant.

Figure 21:
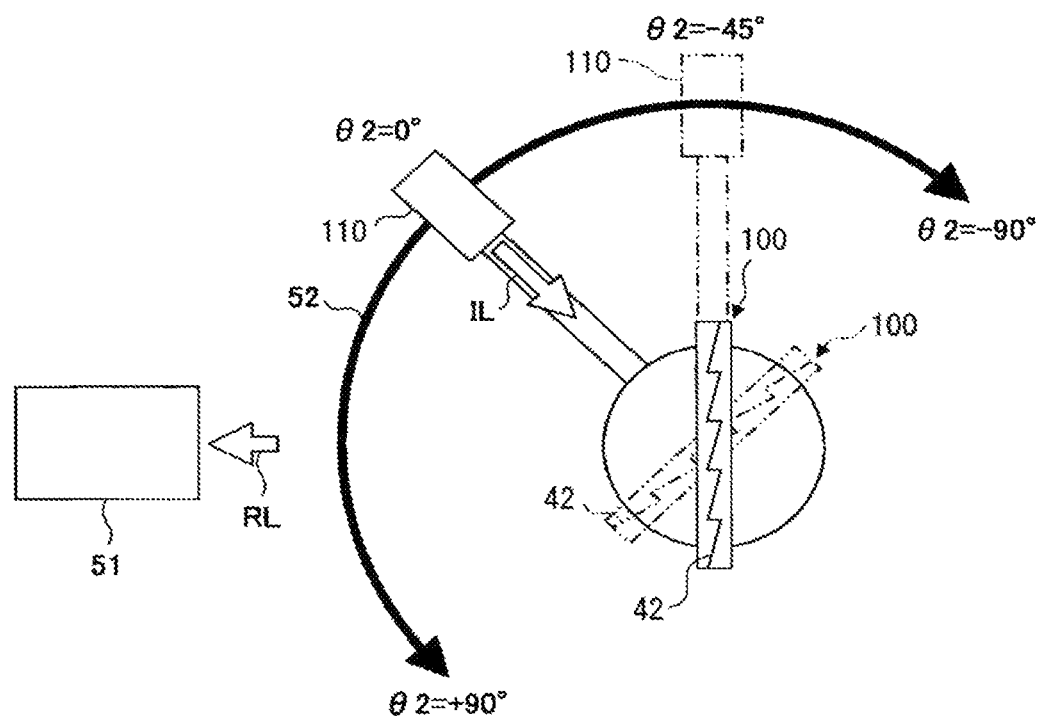
FIG. 21 is a view illustrating an example of a measuring system for measuring the relationship between the outgoing angle of outgoing light and the brightness of the video projecting structure with the incident angle of incident light being kept constant. It should be noted that FIGS. 1 to 20 mentioned above are schematic or diagrammatic representations, and the relationships, such as sizes, are different from the actual ones in some cases.

FIG. 21 is a view illustrating an example of a measuring device for measuring the relationship between the outgoing angle of reflected light RL and the brightness of the video projecting structure 100 with the incident angle of the incident light IL being kept constant. The brightness measuring device 51 is fixed. In constant, the projector 110 is disposed so as to be revolvable along the arced passage 52 such that the outgoing angle θ2 of the reflected light RL can be changed. The video projecting structure 100 is rotated in synchronization with the revolution of the projector 110 such that the incident angle θ1 of the incident light IL (see FIG. 20) is kept constant.

<Viewing Angle Characteristics>

As the index for evaluating the viewing angle characteristics, the full-width-at-half-maximum α of reflected light RL from the video projecting structure 100 was evaluated. The full-width-at-half-maximum α of reflected light means the width of an outgoing angle 82 that a measured value Y is at least half of the maximum value when the measuring system shown in FIG. 20 is used to preliminarily find an incident angle θ1max that maximizes measured values of the brightness with the outgoing angle θ2 being fixed at 0°, and when the measuring system shown in FIG. 21 is used to measure the brightness with the incident angle θ1 being fixed at θ1max.

With regard to the irregularities of the video projecting structures in Examples 1 to 8, the full-width-at-half-maximum α corresponding to the A direction (second direction) in which the average spacing Sm is maximum is defined as a viewing angle A, while the full-width-at-half-maximum α corresponding to the B direction (second direction) is defined as a viewing angle B.

<Screen Gain>

Measurement was performed for a brightness value that was reflected with respect to each outgoing angle θ2 set in intervals of 5° in a range of −80° to +80° by using a measuring system (not shown) wherein the brightness measuring device 51 was disposed so as to be revolvable along the arced passage 52 with the incident angle θ1 being fixed at 0°. In the measurement, brightness rates, each of which was equal to (the brightness value at each outgoing angle θ2 when constant light was applied to the video projecting structure 100)/(the brightness value obtained when the constant light was applied to a standard white plate (complete diffusion plate)) were found. The maximum values of the respective brightness rates were defined as screen gains.

TABLE 1

| Examples | Median value | $Sm_1$ | $Sm_2$ | $Sm_3$ | $Ra_1$ | $Ra_2$ | $Ra_3$ | Viewing angle A | Viewing angle B | Screen gain |
|---|---|---|---|---|---|---|---|---|---|---|
| Example 1 | 14° | 5.8 μm | 40 μm | 22.5 μm | 0.45 μm | 5.0 μm | 0.39 μm | 62° | 46° | 0.50 |
| Example 2 | 14° | 5.8 μm | 40 μm | 2.81 μm | 0.45 μm | 5.0 μm | 0.49 μm | 62° | 40° | 0.60 |
| Example 3 | 14° | 5.8 μm | 40 μm | 31.6 μm | 0.45 μm | 5.0 μm | 0.28 μm | 62° | 27° | 0.80 |
| Example 4 | 14° | 5.8 μm | 40 μm | 5.8 μm | 0.45 μm | 5.0 μm | 0.45 μm | 62° | 62° | 0.30 |
| Example 5 (A Region) | 14° | 22.5 μm | 40 μm | 5.8 μm | 0.39 μm | 5.0 μm | 0.45 μm | 46° | 62° | 0.50 |
| Example 6 | 14° | 0.3 μm | 40 μm | 0.5 μm | 0.45 μm | 5.0 μm | 0.45 μm | 170° | 160° | 0.05 |
| Example 7 | 14° | 0.3 μm | 40 μm | 31.6 μm | 0.45 μm | 5.0 μm | 0.28 μm | 170° | 27° | 0.15 |
| Example 8 | 14° | 1.0 μm | 40 μm | 31.6 μm | 0.45 μm | 5.0 μm | 0.28 μm | 90° | 27° | 0.20 |

As illustrated in the Examples, it is revealed that the video projecting structure 100 according to the present invention is capable of having not only transparency but also high visibility of a video and is also capable of changing the visibility of an image projected on the video projecting structure 100 according to a viewing direction. Thus, the present invention provides a video projecting structure, which allows a plurality of observers to view a video with excellent visibility even when the observers view the video from different directions or when the observers view a portion of the video projected on an end portion of the video projecting structure.

This application is a continuation of PCT Application No. PCT/JP2019/020714, filed on May 24, 2019, which is based upon and claims the benefit of priority from Japanese Patent Application No. 2018-100129 filed on May 25, 2018. The contents of those applications are incorporated herein by reference in their entireties.

REFERENCE SYMBOLS

10: transparent substrate, 11: second transparent substrate, 21: first transparent layer, 22: second transparent layer, 30: reflective film, 31: surface, 40: transparent film (first transparent film), 41: rear surface (reference surface), 42: slant surface, 43: step surface, 44: edge, 50: second transparent film, 90: mold, 90a: irregularity, 100: video projecting structure, 110: projector, 51 and 120: brightness measuring device, 200: observer, IL: incident light, RL: reflected light, θ1: incident angle, θ2: outgoing angle

What is claimed is:

1. A video projecting structure, comprising:
a first transparent layer having irregularities formed on one side;
a reflective layer formed on the one side of the first transparent layer; and
a second transparent layer formed on the reflective layer,
wherein the first transparent layer has a reference surface on an opposite side with respect to the reflective layer, a plurality of slant surfaces formed on the one side and slant with respect to the reference surface, and a plurality of step surfaces formed between the plurality of slant surfaces on the one side respectively such that the slant surfaces have the irregularities formed thereon and reflect light from a video, the slant surfaces extend in a first direction perpendicular to a normal direction of the reference surface, are arrayed in a second direction orthogonal to the first direction, and have an average slant angle θ to the reference surface in a third direction in section in the second direction, the irregularities include a portion configured such that $Sm_2 > Sm_1$ and $Sm_3 > Sm_1$ are met and $Sm_2$ is maximum where $Sm_1$ is an average spacing of the irregularities in the first direction, $Sm_2$ is an average spacing of the irregularities in the second direction and $Sm_3$ is an average spacing of the irregularities in the third direction, the irregularities include a portion configured such that a frequency distribution of inclinations of the irregularities in the second direction to the reference surface is measured in 0.25° divisions in every distance of 1 mm in order that the frequencies are represented as distances and that the absolute value of a median value in the frequency distribution is a value other than 0°.

2. The video projecting structure according to claim 1, wherein the absolute value of the median value is at least 3°.

3. The video projecting structure according to claim 2, wherein $Sm_3$ is at least two times $Sm_1$.

4. The video projecting structure according to claim 2, wherein $Sm_2$ is at most 500 μm.

5. The video projecting structure according to claim 4, wherein $Sm_2$ is at most 100 μm.

6. The video projecting structure according to claim 1, wherein $Sm_3$ is at least two times $Sm_1$.

7. The video projecting structure according to claim 1, wherein $Sm_2$ is at most 500 μm.

8. The video projecting structure according to claim 7, wherein $Sm_2$ is at most 100 μm.

9. The video projecting structure according to claim 1, wherein $Sm_1$ is at least 0.4 μm.

10. The video projecting structure according to claim 9, wherein $Sm_1$ is at least 0.7 μm.

11. The video projecting structure according to claim 1, wherein the irregularities have a smaller arithmetic average roughness Ra in the first direction than a maximum valley depth PV and an arithmetic average roughness Ra in the second direction.

12. The video projecting structure according to claim 1, wherein the irregularities include a portion where $Sm_2 > Sm_1$ and $Sm_1 > Sm_3$ are met.

13. A vehicle window, comprising:
the video projecting structure of claim 1.

14. A video display system comprising:
the video projecting structure of claim 1; and
at least one of a projector configured to project a video on a side of the video projecting structure with the first transparent layer being disposed, or a projector configured to project a video on a side of the video projecting structure with the second transparent layer being disposed.

15. The video display system according to claim 14, wherein when a low-pass filter having a cut-off frequency of 100 μm is applied to a surface shape of the video projecting structure in order to remove a wavy shape of at least 100 μm, the second direction after removal of the wavy shape is a direction in which the average spacing Sm of the irregularities is maximum at an identical point, an absolute value of the difference between the value of an angle AR and the median value of the angles AR measured in all of the regions of the projected portion is within 10°, where the angle AR is formed between the second direction being measured after removal of the wavy shape at plural positions on the projected portion and one direction defined in a plane perpendicular to the normal direction of the reference surface in regions occupying at least 80% of the area of the projected portion of the video projecting structure, and and an absolute value of the difference between the value of an angle BR and the median value of the angles AR measured in all of the regions of the projected portion is greater than 20°, the angle BR being formed between the second direction being measured after removal of the wavy shape at plural positions on the projected portion and one direction defined in a plane perpendicular to the normal direction of the reference surface in regions occupying at least 30% of the area of the projected portion of the video projecting structure.

16. The video display system according to claim 14, wherein when a low-pass filter having a cut-off frequency of 40 μm is applied to the surface shape of the video projecting structure in order to remove a wavy shape of at least 40 μm, the second direction after removal of the wavy shape is a direction in which the average spacing Sm of the irregularities is maximum at an identical point, an absolute value of the difference between the value of an angle AR and the median value of the angles AR measured in all of the regions of the projected portion is within 10°, where the angle AR is formed between the second direction being measured after removal of the wavy shape at plural positions on the projected portion and one direction defined in a plane perpendicular to the normal direction of the reference surface in regions occupying at least 80% of the area of the projected portion of the video projecting structure, and an absolute value of the difference between the value of an angle BR and the median value of the angles AR measured in all of the regions of the projected portion is greater than 20°, the angle BR being formed between the second direction being measured after removal of the wavy shape at plural positions on the projected portion and one direction defined in a plane perpendicular to the normal direction of the reference surface in regions occupying at least 30% of the area of the projected portion of the video projecting structure.

17. The video display system according to claim 14, wherein when a low-pass filter having a cut-off frequency of 15 μm is applied to the surface shape of the video projecting structure in order to remove a wavy shape of at least 15 μm, the second direction after removal of the wavy shape is a direction in which the average spacing Sm of the irregularities is maximum at an identical point, an absolute value of the difference between the value of an angle AR and the median value of the angles AR measured in all of the regions of the projected portion is within 10°, where the angle AR is formed between the second direction being measured after removal of the wavy shape at plural positions on the projected portion and one direction defined in a plane perpendicular to the normal direction of the reference surface in regions occupying at least 80% of the area of the projected portion of the video projecting structure, and an absolute value of the difference between the value of an angle BR and the median value of the angles AR measured in all of the regions of the projected portion is greater than 20°, the angle BR being formed between the second direction being measured after removal of the wavy shape at plural positions on the projected portion and one direction defined in a plane perpendicular to the normal direction of the reference surface in regions occupying at least 30% of the area of the projected portion of the video projecting structure.

18. A process for producing a video projecting structure,
forming a first transparent layer having irregularities formed on one side;
forming a reflective layer on the one side of the first transparent layer; and
forming a second transparent layer on the reflective layer,
wherein the forming of the first transparent layer includes forming, on the one side, a plurality of slant surfaces slant with respect to a reference surface of the first transparent layer on an opposite side with respect to the reflective layer and a plurality of step surfaces between the plurality of slant surfaces respectively such that the slant surfaces have the irregularities formed thereon and reflect light from a video, forming the irregularities including a portion configured such that the slant surfaces extend in a first direction perpendicular to a normal direction of the reference surface, are arrayed in a second direction orthogonal to the first direction, and have an average slant angle $\theta$ to the reference surface in a third direction in section in the second direction, and that $Sm_2 > Sm_1$ and $Sm_3 > Sm_1$ are met, and $Sm_2$ is maximum where $Sm_1$ is an average spacing of the irregularities in the first direction, $Sm_2$ is an average spacing of the irregularities in the second direction and $Sm_3$ is an average spacing of the irregularities in the third direction, and forming the irregularities including a portion configured such that a frequency distribution of inclinations of the irregularities in the second direction to the reference surface is measured in 0.25° divisions in every distance of 1 mm in order that the frequencies are represented as distances and that the absolute value of a median value in the frequency distribution is a value other than 0°.

19. The process according to claim 18, wherein the irregularities is formed on the first transparent layer by a stamping method including transferring a pattern of irregularities of a mold to a target.

20. The process according to claim 18, wherein the forming of the irregularities includes etching the slant surfaces of the first transparent layer.

* * * * *